United States Patent
Park et al.

(10) Patent No.: US 11,962,550 B2
(45) Date of Patent: Apr. 16, 2024

(54) METHOD AND APPARATUS FOR PROVIDING CUSTOMIZED CHAT ROOM USER INTERFACE BASED ON VIDEO INFORMATION

(71) Applicant: SAMSUNG ELECTRONICS CO., LTD., Suwon-si (KR)

(72) Inventors: Eunhee Park, Suwon-si (KR); Yuri Min, Suwon-si (KR); Heejeong Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/951,456

(22) Filed: Sep. 23, 2022

(65) Prior Publication Data

US 2023/0208788 A1    Jun. 29, 2023

Related U.S. Application Data

(63) Continuation of application No. PCT/KR2022/013210, filed on Sep. 2, 2022.

(30) Foreign Application Priority Data

Dec. 27, 2021    (KR) .......................  10-2021-0188384

(51) Int. Cl.
*H04L 51/046*    (2022.01)
*H04L 51/07*    (2022.01)

(52) U.S. Cl.
CPC ............ *H04L 51/046* (2013.01); *H04L 51/07* (2022.05)

(58) Field of Classification Search
CPC .............................. H04L 51/046; H04L 5/017

USPC ......................................................... 715/753
See application file for complete search history.

(56) References Cited

U.S. PATENT DOCUMENTS

| | | | |
|---|---|---|---|
| 8,938,669 B1 * | 1/2015 | Cohen ................. | G06Q 10/101 709/204 |
| 9,077,699 B1 * | 7/2015 | James ................... | H04L 51/046 |
| 9,756,396 B2 | 9/2017 | Nam et al. | |
| 9,819,624 B2 * | 11/2017 | Buchheit ............... | H04L 51/216 |
| 10,015,556 B2 * | 7/2018 | DeWeese ........... | H04N 21/8173 |

(Continued)

FOREIGN PATENT DOCUMENTS

| | | |
|---|---|---|
| KR | 10-2001-0008275 | 2/2001 |
| KR | 10-2005-0102858 A | 10/2005 |

(Continued)

OTHER PUBLICATIONS

Search Report and Written Opinion dated Dec. 15, 2022 issued in International Patent Application No. PCT/KR2022/013210.

*Primary Examiner* — William D Titcomb
(74) *Attorney, Agent, or Firm* — Nixon & Vanderhye P.C.

(57) ABSTRACT

Various embodiments of the disclosure relate to a method and apparatus for determining a chat mode based on real-time viewing video information output from a display device, and providing a customized chat room user interface based on the determined chat mode. The display device may include receiving a real-time viewing video and real-time viewing video information, determining a chat mode of a chat room corresponding to the real-time viewing video based on the real-time viewing video information, and outputting a user interface including at least one preset phrase or at least one emoticon based on the chat mode.

19 Claims, 18 Drawing Sheets

(56) References Cited

U.S. PATENT DOCUMENTS

| | | | |
|---|---|---|---|
| 10,219,044 B2 | 2/2019 | Rashkovskiy et al. | |
| 10,404,636 B2* | 9/2019 | Rodriguez | H04L 51/04 |
| 10,841,115 B2* | 11/2020 | Anderson | G10L 17/00 |
| 2003/0228909 A1* | 12/2003 | Tanaka | A63F 13/87 |
| | | | 463/42 |
| 2008/0288990 A1 | 11/2008 | Koh et al. | |
| 2009/0202114 A1* | 8/2009 | Morin | A63F 13/12 |
| | | | 382/118 |
| 2011/0289156 A1* | 11/2011 | Pirnazar | H04L 51/046 |
| | | | 715/205 |
| 2011/0289157 A1* | 11/2011 | Pirnazar | H04L 51/52 |
| | | | 709/227 |
| 2012/0069028 A1* | 3/2012 | Bouguerra | H04L 51/046 |
| | | | 715/810 |
| 2013/0055112 A1* | 2/2013 | Joseph | H04L 12/1827 |
| | | | 715/758 |
| 2013/0159074 A1* | 6/2013 | Chavan | G06F 3/048 |
| | | | 709/206 |
| 2013/0191870 A1* | 7/2013 | Nam | H04N 21/42208 |
| | | | 725/49 |
| 2014/0019884 A1* | 1/2014 | Dinan | H04L 12/1813 |
| | | | 709/206 |
| 2014/0173003 A1* | 6/2014 | Van | G06Q 10/10 |
| | | | 709/206 |
| 2018/0367484 A1* | 12/2018 | Rodriguez | H04L 51/10 |
| 2019/0289372 A1* | 9/2019 | Merler | G06N 3/045 |
| 2022/0247919 A1* | 8/2022 | O'Leary | H04N 5/2628 |

FOREIGN PATENT DOCUMENTS

| | | |
|---|---|---|
| KR | 10-2013-0077237 A | 7/2013 |
| KR | 10-1667603 B1 | 10/2016 |
| KR | 10-1685974 | 12/2016 |
| KR | 10-1886628 | 9/2018 |
| KR | 10-1990866 | 6/2019 |
| KR | 10-2020-0001153 | 1/2020 |
| KR | 10-2114703 | 5/2020 |
| KR | 10-2020-0073502 | 6/2020 |
| KR | 10-2283232 B1 | 7/2021 |

* cited by examiner

METHOD AND APPARATUS FOR PROVIDING CUSTOMIZED CHAT ROOM USER INTERFACE BASED ON VIDEO INFORMATION

CROSS REFERENCE TO RELATED APPLICATIONS

This application is a continuation application of International Application No. PCT/KR2022/013210 designating the United States, filed on Sep. 2, 2022, in the Korean Intellectual Property Receiving Office and claims priority from Korean Patent Application No. 10-2021-0188384, filed on Dec. 27, 2021, in the Korean Intellectual Property Office, the disclosures of which are incorporated by reference herein in their entireties.

BACKGROUND

Field

The disclosure relates to a method and apparatus for determining a chat mode based on video information viewed in a real-time basis output from a display device, and providing a customized chat room user interface (UI) based on the determined chat mode.

Description of Related Art

As the network technology and the signal processing technology of a server continue to develop, a real-time online chat service is recently being provided. Further, along with the rapid spread of video services through Internet, a service in which multiple viewers participate in chatting together in a chat room created by a video service operator while playing a video on a PC or a mobile device has also emerged.

Meanwhile, as the demands for providing various functions and practicality on smart TVs further increase, the research and development on the smart TVs to improve a user's viewing experience by serving a variety of functions such as a video viewing as well as various information provision are being actively conducted.

When a user has a chat while watching a real-time video on a display device such as a television (TV), the user may have a limited chatting experience. In particular, when a chat message is input on the display device, there might be some restrictions on a user interface scheme using an existing remote control.

SUMMARY

Embodiments of the disclosure provide a method and apparatus for determining a chat mode based on video information viewed in a real-time basis output from a display device, and providing a customized chat room user interface based on the determined chat mode According to an example embodiment of the present disclosure, a display device may comprise: a display; a communication module comprising communication circuitry; a memory storing at least one instruction; one or more processors electrically connected to the display, the communication module, and the memory and executing the at least one instruction; and an video input module comprising circuitry and configured to receive a real-time viewing video and real-time viewing video information; wherein the one or more processors may be configured to: determine a chat mode of a chat room corresponding to the real-time viewing video based on the real-time viewing video information, and output, to the display, a user interface including at least one specified phrase or at least one emoticon based on the chat mode.

According to an example embodiment of the present disclosure, a method for providing a chat room user interface may comprise: receiving a real-time viewing video and real-time viewing video information; determining a chat mode of a chat room corresponding to the real-time viewing video based on the real-time viewing video information; and outputting a user interface including at least one specified phrase or at least one emoticon based on the chat mode.

According to various example embodiments of the present disclosure, it is possible to determine a chat mode based on real-time viewing video information on a display device such as a TV, and provide a customized chat room user interface according to the determined chat mode. This may provide a convenient and useful user interface corresponding to the real-time viewing video, thereby enabling to further expand the user's chatting experience while watching the real-time viewing video on a display device, and promoting using of a chat service on the display device.

Further, it is possible to provide various functions, such as e.g., providing various information that may be provided in relation to a video while watching the video in a real-time basis, and sharing a social activity with a group of viewers, in a user-friendly manner by means of such a chat service. This makes it possible to promote usage of a chat service on a display device and more increase user satisfaction with the display device.

The effects that can be obtained from the various example embodiments of the present disclosure are not limited to those described above, and any other effects not mentioned herein will be clearly understood by those having ordinary knowledge in the technical field to which the present disclosure belongs from the following description.

BRIEF DESCRIPTION OF THE DRAWINGS

The above and other aspects, features and advantages of certain embodiments of the present disclosure will be more apparent from the following description, taken in conjunction with the accompanying drawings, in which.

DETAILED DESCRIPTION

Figure 1:
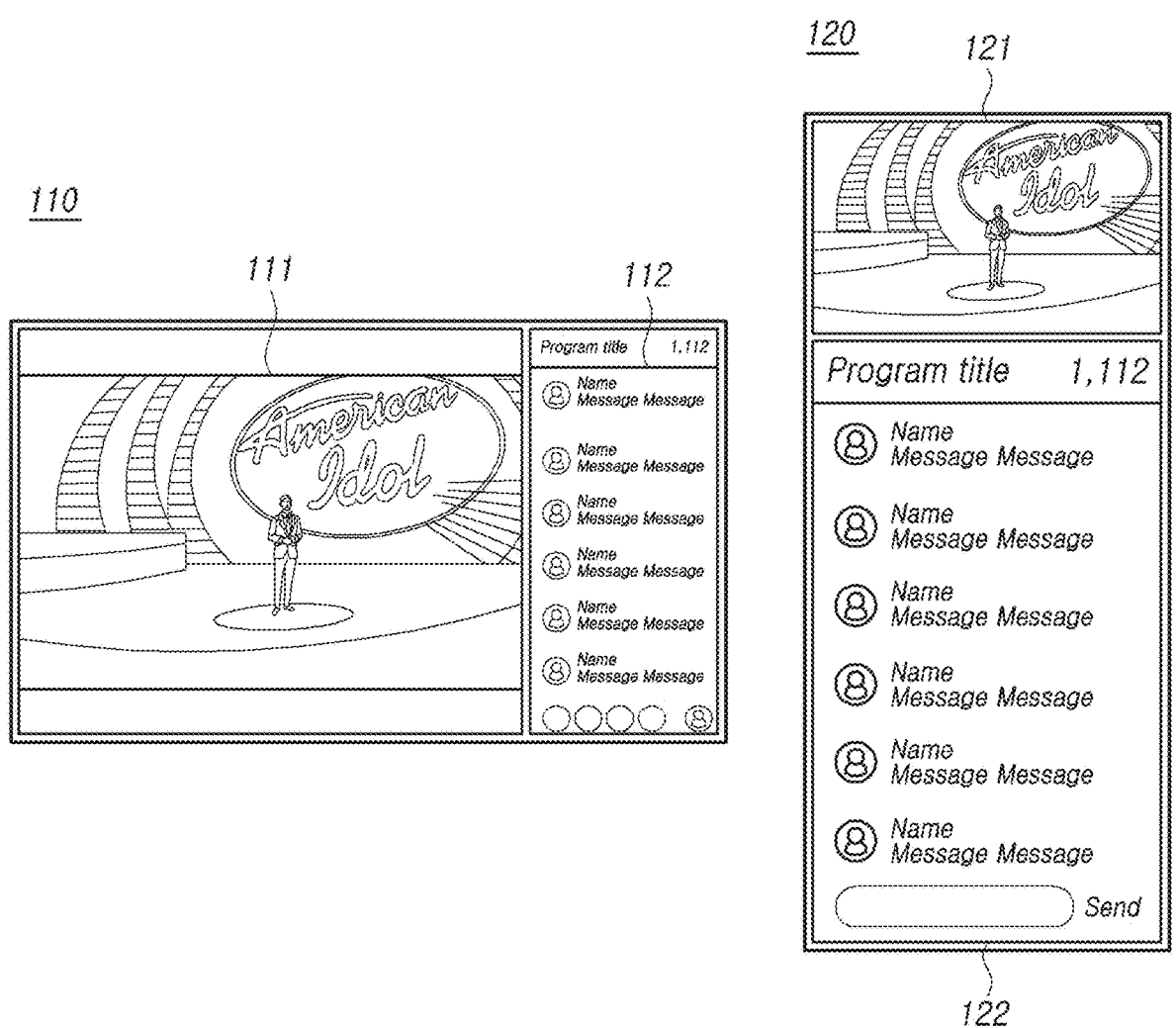
FIG. 1 is a diagram illustrating an example of an output screen of providing a chat service simultaneously with watching a real-time viewing video on a display device, according to various embodiments.

Hereinafter, with reference to the drawings, various example embodiments of the present disclosure will be described in greater detail. However, the present disclosure may be implemented in several different forms and is not limited to the embodiments described herein. In connection with the description of the drawings, like or similar reference numerals may be used for like or similar components. Further, in the drawings and their related descriptions, descriptions of well-known functions and configurations may be omitted for clarity and conciseness.

FIG. 1 is a diagram illustrating an example of an output screen of providing a chat service simultaneously with watching a real-time viewing video on a display device, according to various embodiments.

Referring to FIG. 1, the display devices 110 and 120 may display chat rooms 112 and 122 each corresponding to real-time viewing videos 111 and 121, while simultaneously displaying the videos in real time. The display devices 110 and 120 may determine a chat mode based on real-time viewing video information, and may provide a customized chat room user interface based on the determined chat mode.

According to an embodiment, the chat rooms 112 and 122 may be provided from a server device (not shown) by a service operator providing a chat service, but the display devices 110 and 120 may provide a chatbot participating chat service by a user's selection even for a real-time viewing video for which a chat room is not serviced from the server device, thereby providing a user with an experience of having a chat while watching a video in real time. Further, according to an embodiment, even when watching a real-time viewing video provided with the chat rooms 112 and 122 from the server device, if there are few chat room participants or their chatting is not active, the display devices 110 and 120 may provide a chatbot participating chat service by the user's selection, which may give the users more choice about their chatting experience.

According to various embodiments, the display devices 110 and 120 may include a user device capable of performing various computing functions, such as real-time video viewing, chatting, and communications. The display devices 110 and 120 may include, for example, TVs, desktop computers, smart phones, notebook computers, tablet PCs, mobile phones, personal digital assistants (PDAs), laptops, media players, e-book terminals, digital broadcasting terminals, navigation devices, kiosks, digital cameras, home appliances, and/or other mobile or non-mobile computing devices, but the present disclosure is not limited thereto. Further, the display devices 110 and 120 may include a wearable terminal such as watches and glasses capable of performing various computing functions, such as e.g., real-time video viewing, chatting, and communication. The display devices 110 and 120 may be various types of terminals without being limited to the above description. A schematic block diagram of the display devices 110 and 120 will be described below with reference to FIG. 3.

According to various embodiments, the server device providing a chat service may include a computing device capable of performing various computing functions, such as e.g., video analysis, chat management, and communication.

Figure 2:
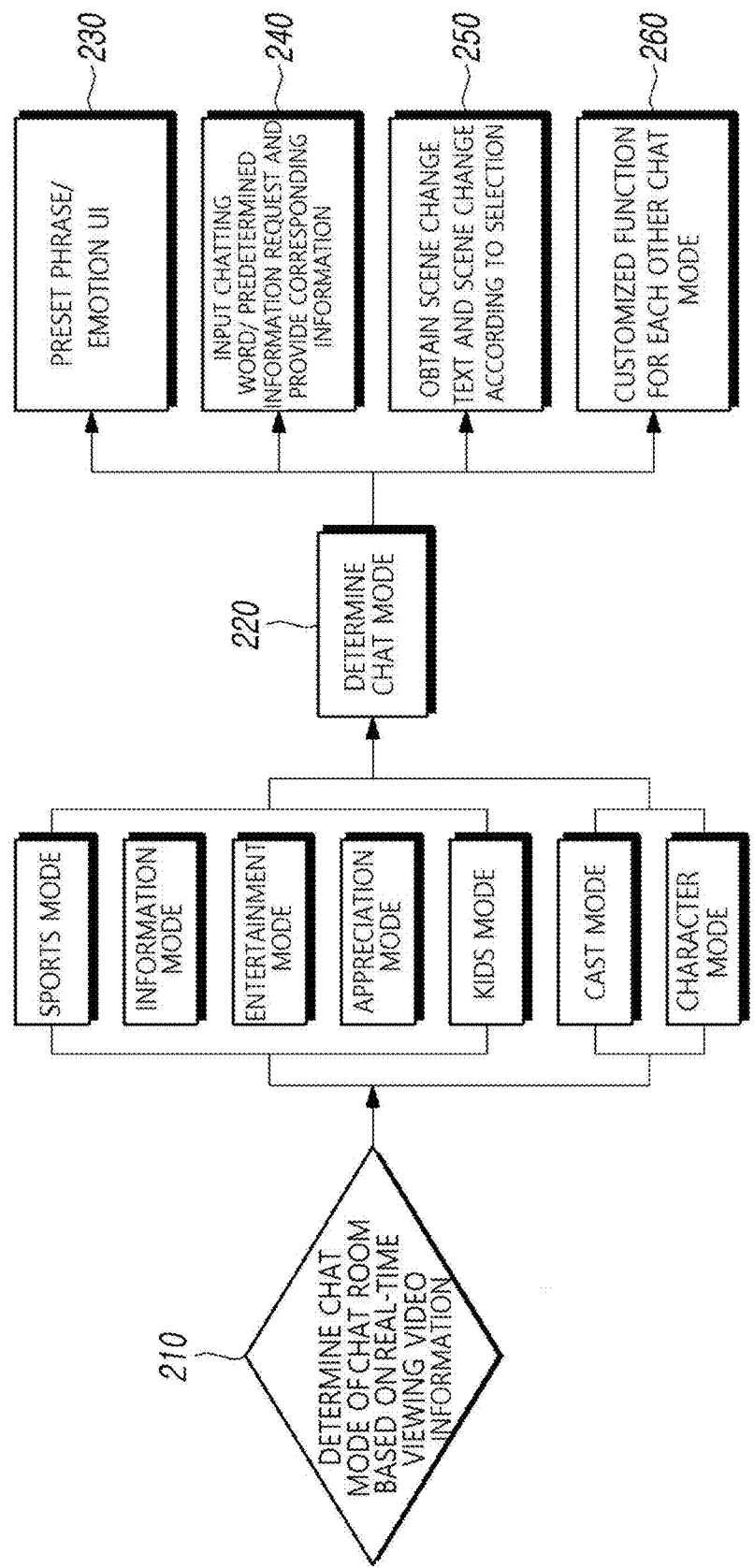
FIG. 2 is a diagram illustrating an example of providing a user interface corresponding to a chat mode determined based on real-time viewing video information, according to various embodiments.

FIG. 2 is a diagram illustrating an example of providing a user interface corresponding to a chat mode determined based on real-time viewing video information, according to various embodiments.

The display devices 110 and 120 may receive a real-time viewing video and real-time viewing video information and determine a chat mode of a chat room corresponding to the real-time viewing video based on the real-time viewing video information (210). The real-time viewing video information may include video metadata including identification information, genre information and cast information, character information of the real-time viewing video, etc. The chat mode may include, for example, and without limitation, at least one of sports mode, information mode, entertainment mode, appreciation mode, kids mode, cast mode, and character mode. Such sports mode, information mode, entertainment mode, appreciation mode, and kids mode may be determined based on genre information of the real-time viewing video information, and the cast mode and the character mode may be determined based on the cast information or the character information of the real-time viewing video information. The display devices 110 and 120 may automatically determine the chat mode, or may determine the chat mode based on receiving a selected input from the user after outputting the chat mode on the display (220). For example, the display devices 110 and 120 may output a chat mode for each of at least one cast member or character on the display, receive a selected input from the user, and then determine the chat mode corresponding to a specific cast member or a specific character.

The display devices 110 and 120 may output a user interface including at least one preset phrase or at least one emoticon on the display based on the chat mode (230). The preset phrase may include a phrase frequently used in the chat mode. The user interface including the preset phrase or emoticon corresponding to the chat mode will be described below with reference to FIGS. 4, 8 and 12.

The display devices 110 and 120 may obtain at least one chatting word and a predetermined information request input based on a user input, and obtain information corresponding to the at least one chatting word in response to the predetermined information request input, and output the information corresponding to the at least one chatting word to the display (240). The user input may include a voice signal or a text received from a mobile electronic device or a remote control. The predetermined information request input may include a predetermined call symbol such as e.g., '#', '?' or the like. An information providing user interface corresponding to a chatting word and an information request input in each chat mode will be described in greater detail below with reference to FIGS. 5, 9 and 13.

The display devices 110 and 120 may obtain a scene change text based on a predetermined criterion, obtain a scene change request input for the scene change text based on a user input, obtain a playback time of the real-time viewing video corresponding to the scene change text in response to the scene change request input, and output to the display a portion of the real-time viewing video corresponding to the playback time of the real-time viewing video (250). In relation to the predetermined criterion, the display devices 110 and 120 may obtain the text input more than a predetermined number of times within a predetermined time in the chat room, as the scene change text, or may store at least one scene change text corresponding to each chat mode in the memory in advance and obtain a text input to the chat room from among the at least one scene change text as the scene change text. In addition, it would be apparent to those skilled in the art that the predetermined criteria for obtaining the scene change text may vary. Examples of inputting a scene change request for a scene change text in each chat mode and moving to a corresponding scene to display the scene will be described in greater detail below with reference to FIGS. 6, 10 and 14.

The display devices 110 and 120 may provide a user interface customized for each chat mode (260). For example, when the chat mode is a sports mode, the display devices may apply and output, to the chat room, a specific design style related to a cheering team selected based on a user input (e.g., representative color, symbol, font, mascot, and player character for the cheering team, etc.), change a user profile and so on based on a user input, and provide a social activity function with a chat room participant group, such as e.g., voting for an expected score. For another example, when the chat mode is an appreciation mode, the display devices may provide a 'Like' tagging for each scene of the real-time viewing video, a tagging list, a function to switch to a corresponding scene upon selecting a specific tagging scene, and so on. Furthermore, when the chat mode is an entertainment mode, it may provide an information search function for any real-time viewing video. The user interface specifically customized for each chat mode will be described below with reference to FIGS. 7, 11 and 15.

Figure 3:
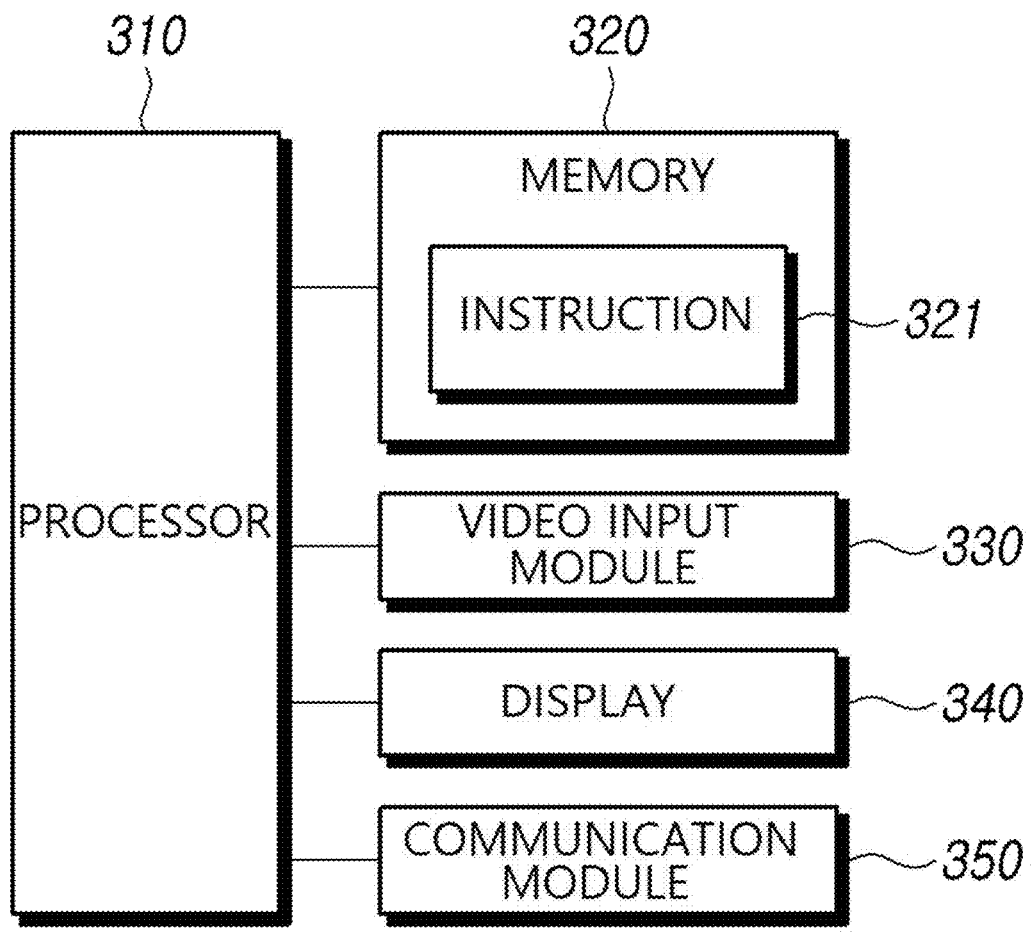
FIG. 3 is a block diagram illustrating an example configuration of a display device, according to various embodiments.

FIG. 3 is a block diagram illustrating an example configuration of a display device according to various embodiments.

Referring to FIG. 3, the display device 300 may include a processor (e.g., including processing circuitry) 310, a memory 320, a video input module (e.g., including video input circuitry) 330, a display 340, and a communication module (e.g., including communication circuitry) 350. The display device 300 may further include any other components in addition to the illustrated components, or may omit at least one of the illustrated components.

According to various embodiments, the display device 300 may include a user device capable of performing various computing functions, such as e.g., real-time video viewing, chatting, and communication. The display device 300 may include, for example, a TV, a desktop computer, a smart phone, a notebook computer, a tablet PC, a mobile phone, a personal digital assistant (PDA), a laptop, a media player, an e-book terminal, a digital broadcasting terminal, a navigation device, a kiosk, a digital camera, a home appliance, any other mobile or non-mobile computing device, and so on, but the present disclosure is not limited thereto. Further, the display device 300 may be a wearable terminal such as e.g., watch and glasses capable of performing various computing functions such as e.g., real-time video viewing, chatting, and communication. The display device 300 may be various types of terminals without being limited to those described above.

According to an embodiment, the memory 320 may be of a storage medium used by the display device 300 to store data such as e.g., at least one instruction 321 corresponding to at least one program or setting information. The program may include an operating system (OS) program and various application programs. The memory 320 may be configured of a volatile memory, a non-volatile memory, or a combination of a volatile memory and a non-volatile memory. The memory 320 may provide stored data according to a request of the processor 310.

According to an embodiment, the video input module 330 may include various circuitry and receive a real-time viewing video and real-time viewing video information through a tuner (not shown), an input/output module (not shown), or the communication module 350. The real-time viewing video information may include video metadata including identification information, genre information, cast information, character information of a real-time viewing video, and the like. To this end, the video input module 330 may include at least one of the tuner and the input/output module. The tuner may serve to be tuned to and select only the frequency for a broadcast channel to be received by the display device 300 from among a large number of various radio wave components through amplification, mixing, resonance, and so forth of broadcast signals received via wired or wireless communication. The broadcast signals may include video, audio, and additional data (e.g., electronic program guide (EPG)). The tuner may receive a real-time broadcasting channel (or a real-time viewing video) from various broadcasting sources such as e.g., terrestrial broadcasting, cable broadcasting, satellite broadcasting, and Internet broadcasting. The tuner may be implemented integrally with the display device 300 or as a separate tuner electrically connected to the display device 300. The input/output module may include at least one of a high-definition multimedia interface (HDMI) input port, a component input jack, a PC input port and a USB input jack, capable of receiving a real-time viewing video and real-time viewing video information from an external device of the display device 300 under the control of the processor 310. It would be apparent to those skilled in the art that the input/output module may be added, deleted, and/or changed according to the performance and structure of the display device 300.

According to an embodiment, the display 340 may perform functions for outputting information in the form of numbers, characters, images, and/or graphics. The display 340 may include at least one hardware module for outputting. The at least one hardware module may include at least one of, for example, a liquid crystal display (LCD), a light emitting diode (LED), a light emitting polymer display (LPD), an organic light emitting diode (OLED), and an active-matrix organic light emitting diode (AMOLED), or a flexible light emitting diode (FLED). The display 340 may display a screen corresponding to data received from the processor 310. The display 340 may be referred to as an 'output unit', a 'display unit', or other terms having a technical meaning equivalent thereto.

According to an embodiment, the communication module 350 may include various communication circuitry and provide a wired/wireless communication interface that enables communication with an external device. The communication module 350 may include at least one of a wired Ethernet, a wireless LAN communication module, and a short-range communication module. The wireless LAN communication module may include, for example, Wi-Fi, and may support a wireless LAN standard (IEEE802.11x) of the American Institute of Electrical and Electronics Engineers (IEEE). The wireless LAN communication module may be wirelessly connected to an access point (AP) under the control of the processor 310. The short-range communication module may perform wireless short-range communication with an external device under the control of the processor 310. The short-range communication may include, for example, Bluetooth™, Bluetooth Low Energy™, Infrared Data Association (IrDA), Ultra-Wideband (UWB), Near Field Communication (NFC) and so forth. The external device may include a server device providing video or chat services and a mobile terminal (e.g., a phone, a tablet, etc.).

According to an embodiment, the processor 310 may include various processing circuitry and execute at least one instruction 321 stored in the memory 320, thereby performing an arithmetic operation or a data processing operation related to control and/or communication of at least one other component of the display device 300. The processor 310 may include, for example, and without limitation, at least one of a central processing unit (CPU), a graphic processing unit (GPU), a micro controller unit (MCU), a sensor hub, a supplementary processor, a communication processor, an application processor, an application specific integrated circuit (ASIC) or field programmable gate arrays (FPGA), and may have multiple cores.

According to an embodiment, the processor 310 may determine a chat mode of a chat room corresponding to the real-time viewing video based on the real-time viewing video information. The real-time viewing video information may include video metadata including identification information, genre information, cast information, character information of the real-time viewing video, and so on. The chat mode may include at least one of e.g., a sports mode, an information mode, an entertainment mode, an appreciation mode, a kids mode, a cast mode, and a character mode. The processor 310 may automatically determine the chat mode based on the real-time viewing video information, or may determine the chat mode by receiving an input selected from the user after outputting the chat mode to the display 340. For example, the processor 310 may output a chat mode for at least one designated cast member or a specific character on the display and then receive a selected input from the user to determine the selected chat mode corresponding to the designated cast member or the specific character.

According to an embodiment, the processor 310 may output a user interface including at least one preset phrase or at least one emoticon to the display 340 based on the chat mode. The processor 310 may store the at least one preset phrase or the at least one emoticon corresponding to the chat mode in the memory 320 in advance, based on a user input, or after receiving the real-time viewing video, control the communication module 350 at a predetermined timing to receive the same from a server device providing a chat service and store it in the memory 320. Further, according to an embodiment, the processor 310 may further consider the chat mode as well as the real-time viewing video information, and therefore, receive from the server device the at least one preset phrase or the at least one emoticon corresponding to the chat mode and the real-time viewing video information to store the same in the memory 320. For example, the processor 310 may receive an emoticon corresponding to a specific cast member or a specific character from the server device, based on the cast information or the character information among the real-time viewing video information, to store the received emoticon in the memory 320. The server device may analyze a frequently used preset phrase/emoticon or a preset phrase/emoticon with higher usability, based on the chat mode or the real-time viewing video information, and provide the same to the display device 300. It would be apparent to those skilled in the art that there may be various methods in which the processor 310 controls the communication module 350 to request and receive at least one preset phrase or at least one emoticon from the server device.

According to an embodiment, the processor 310 may obtain at least one chatting word and a predetermined information request input, based on a user input. The user input may include a voice signal or a text received from a mobile electronic device or a remote control. The predetermined information request input may include predetermined a call symbol such as, e.g., '#', '?', etc. The processor 310 may obtain information corresponding to the at least one chatting word in response to the predetermined information request input, and output the information corresponding to the at least one chatting word to the display 340. For example, in response to the predetermined information request input, the processor 310 may control the communication module 350 to receive the information corresponding to the at least one chatting word from a predetermined server device. The predetermined server device may include a predetermined information providing server device, such as e.g., a chatting server, a portal server or the like. For another example, in response to the predetermined information request input, the processor 310 may analyze at least one of the real-time viewing video, the real-time viewing video information, and a chatting history of the chat room, to obtain the information corresponding to the at least one chatting word. It would be apparent to those skilled in the art that there may be various methods for the processor 310 to control the communication module 350 to request and receive the information corresponding to the at least one chatting word from the predetermined server device.

According to an embodiment, the processor 310 may obtain a scene change text based on a predetermined criterion, and obtain a scene change request input for the scene change text based on a user input. The processor 310 may obtain a playback time of the real-time viewing video corresponding to the scene change text, in response to the scene change request input, and output to the display 340 a portion of the real-time viewing video corresponding to the playback time of the real-time viewing video. In relation to the predetermined criterion, the processor 310 may obtain the text input more than a predetermined number of times within a predetermined time in the chat room, as a scene change text, or may store at least one scene change text that may be related to a main scene in each chat mode, in the memory 320 in advance, and obtain the text input to the chat room from among the at least one scene change text, as a scene change text. For example, the processor 310 may store at least one scene change text identical or similar to "Goal", "Won", "Jackpot", etc., in the memory 320 in advance, in response to the sports mode, and store at least one scene change text identical to or similar to "Where are you?", "What product is it?", etc. in the memory 320 in advance, in response to the information mode. In addition, it would be apparent to those skilled in the art that the predetermined criteria for obtaining the scene change text may vary. For example, the processor 310 may obtain the text input 10 times or more within 5 minutes in a chat room as a scene change text, apply a hyperlink to a scene change text input at a predetermined time (e.g., the first round) among the input scene change texts, and when the user clicks on the hyperlink (that is, inputting a scene change request), obtain the playback time of the real-time viewing video corresponding to the corresponding scene change text to output the same in the scene change to the display 340. The processor 310 may receive and obtain the playback time of the real-time viewing video corresponding to the scene change text from a video server, or analyze and obtain at least one of the real-time viewing video, the real-time viewing video information, and the chatting history of the chat room. It would be apparent to those skilled in the art that the processor 310 may obtain the playback time of the real-time viewing video corresponding to the scene change text in various ways.

Figure 4:
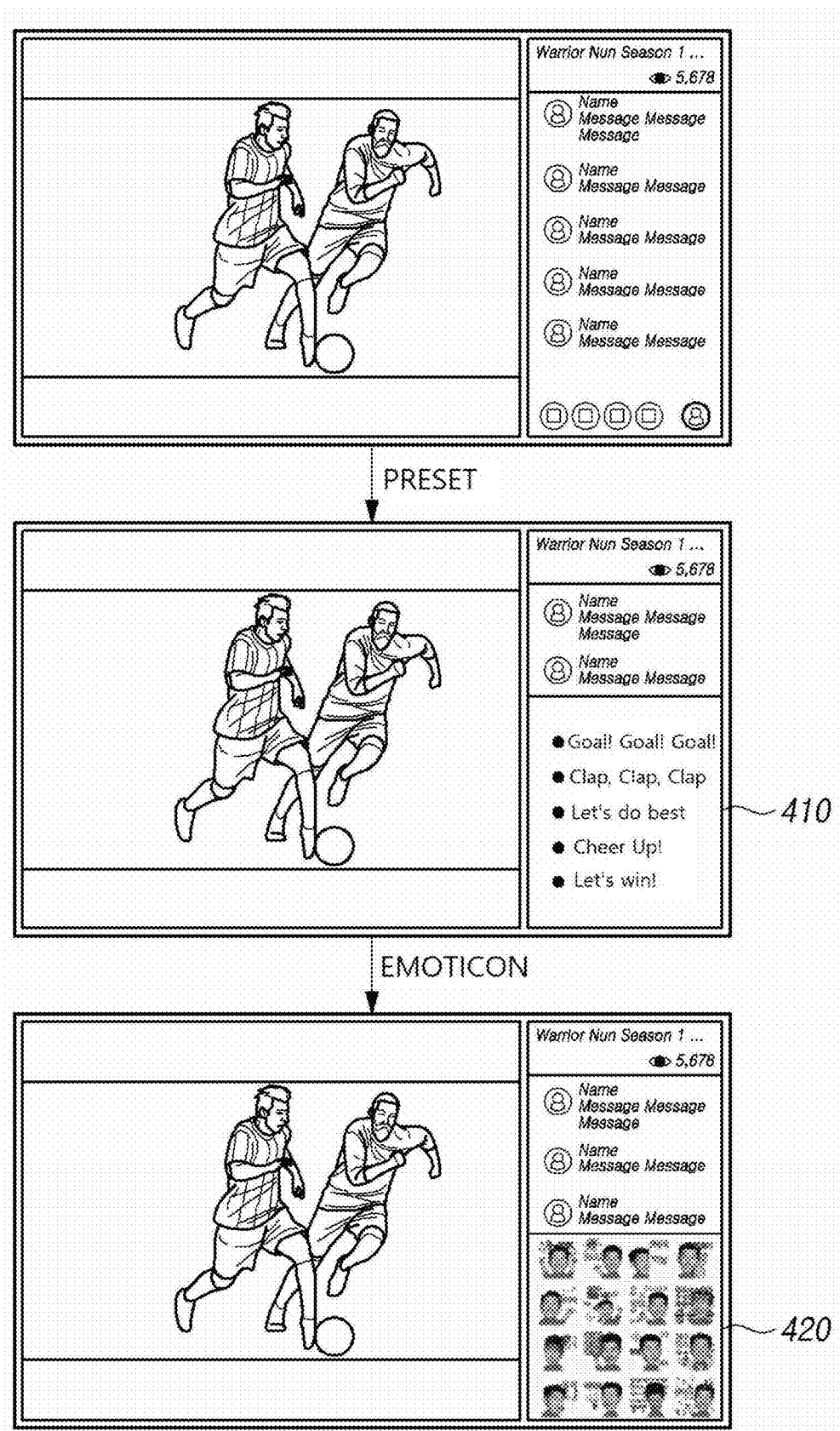
FIG. 4 is a diagram illustrating an example of a user interface including a preset phrase or emoticon corresponding to a sports mode, according to various embodiments.

FIG. 4 is a diagram illustrating an example of a user interface including a preset phrase or emoticon corresponding to a sports mode, according to various embodiments.

Referring to FIG. 4, when the chat mode determined based on the real-time viewing video information is a sports mode, the display device 300 may output, to the display 340, a user interface including a preset phrase 410 or an emoticon 420, based on a user input from the user. Referring to FIG. 4, when the user clicks a preset request emoticon under the chat room, the display device may receive the preset phrase 410 corresponding to the sports mode from a server device providing a chat service and output the same to the display 340. Further, when the user clicks an emoticon for emoticon request under the chat room, the display device may receive a predetermined emoticon 420 from the server device, based on at least one of the cast information of the real-time viewing video information and the sports mode, and output the same to the display 340.

Figure 5:
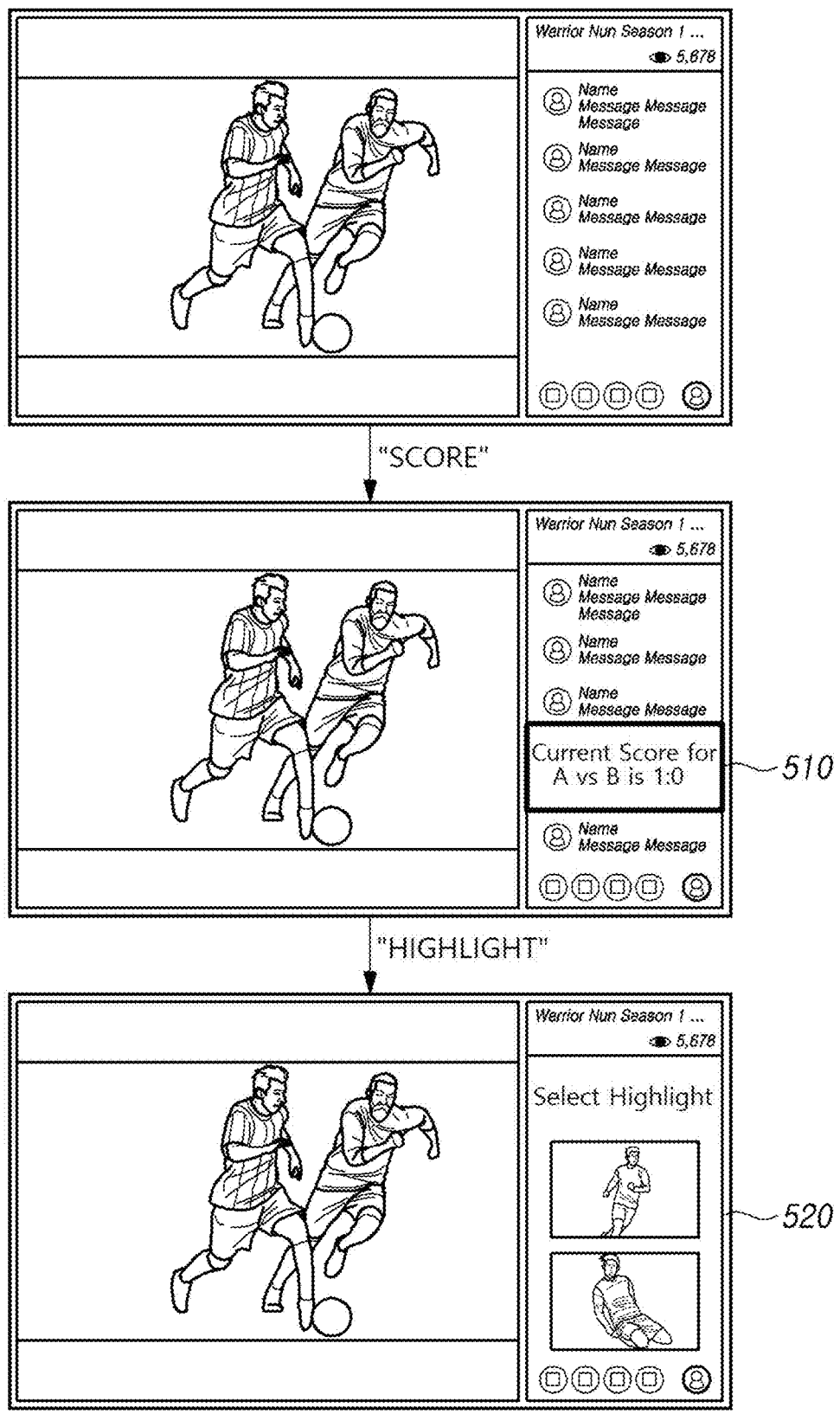
FIG. 5 is a diagram illustrating an example of a user interface for providing information in response to a chatting word and an information request input in a sports mode, according to various embodiments.

FIG. 5 is a diagram illustrating an example of a user interface for providing information in response to a chatting word and an information request input in a sports mode, according to various embodiments.

Referring now to FIG. 5, the display device 300 may obtain at least one chatting word and a predetermined information request input, based on a user input. The user input may include a voice signal or a text received from a mobile electronic device or a remote control. The predetermined information request input may include predetermined call symbols such as, e.g., '#', '?', etc. Referring to the illustrated example, when the user inputs a text 'score' and a predetermined information request input in the chat room, the display device 300 may receive current score information 510 from a predetermined server device and output the same to the display 340. When the user inputs a text 'score' and a predetermined information request input in the chat room, the display device 300 may analyze at least one of the real-time viewing video, the real-time viewing video information, and the chatting history of the chat room to obtain the current score information 510 and output the same to the display 340. Referring to the illustrated example, when the user inputs a text 'highlight' and a predetermined information request input in the chat room, the display device 300 may receive at least one highlight scene 520 of the real-time viewing video from the predetermined server device and output the same to the display 340. When the user inputs a text 'highlight' and a predetermined information request input in the chat room, the display device 300 may analyze at least one of the real-time viewing video, the real-time viewing video information and the chatting history of the chat room to obtain at least one highlight scene 520 and output the same to the display 340. When the user selects a specific highlight scene, the display device 300 may output the specific highlight scene to the display 340.

Figure 6:
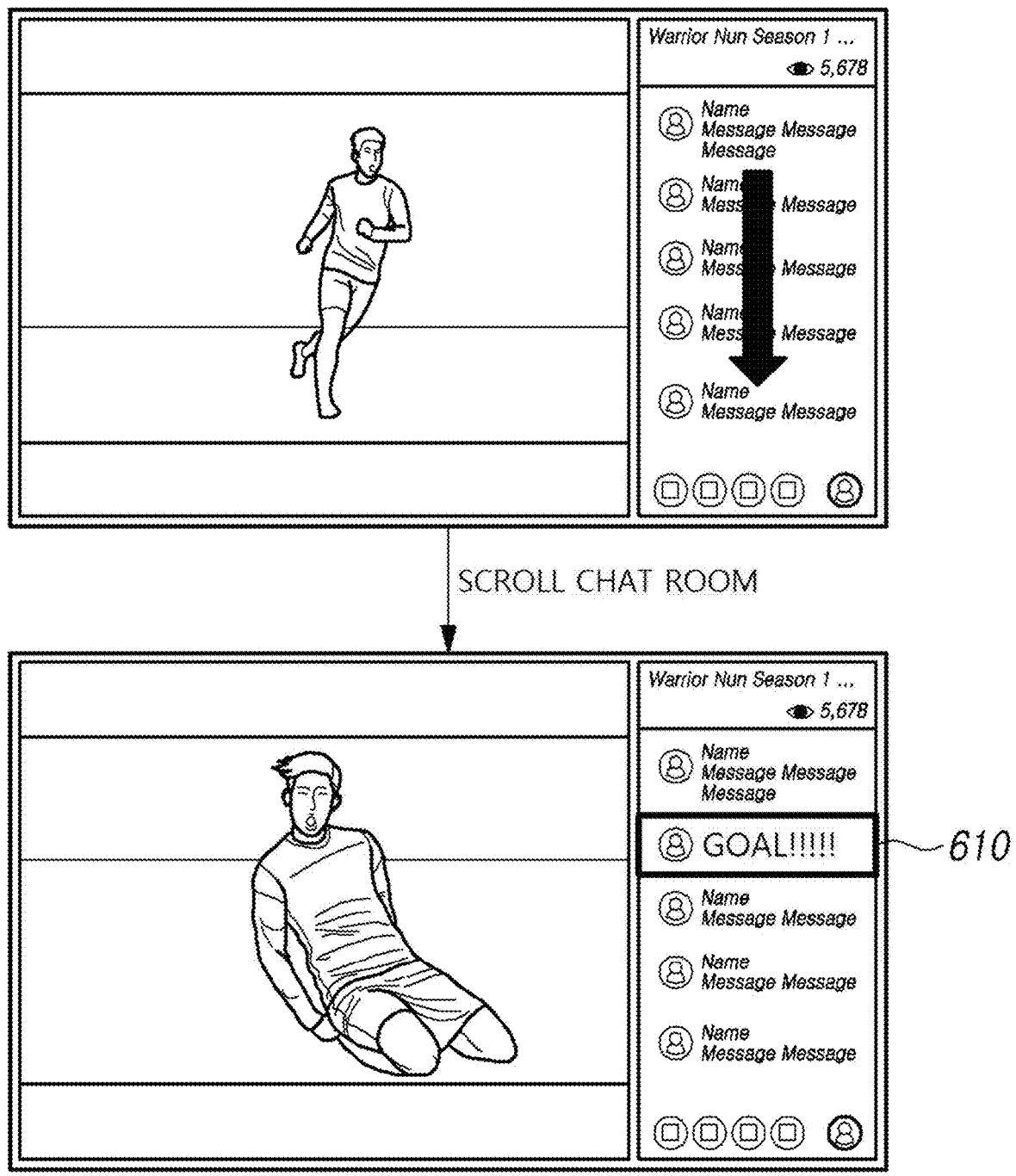
FIG. 6 is a diagram illustrating an example screen of a scene change request input for a scene change text and moving to a corresponding scene to output the scene in a sports mode, according to various embodiments.

FIG. 6 is a diagram illustrating an example screen of a scene change request input for a scene change text and moving to a corresponding scene to output the scene in a sports mode, according to various embodiments.

Referring to FIG. 6, the display device 300 may obtain a scene change text in the chat room based on a predetermined criterion. In relation to the predetermined criterion, the display device 300 may obtain a text input more than a predetermined number of times within a predetermined time in the chat room, as a scene change text, or may store at least one scene change text that may be related to a main scene in each chat mode, in the memory 320 in advance, and then obtain the text input to the chat room among the at least one scene change text, as a scene change text. In the illustrated example, the display device 300 may obtain a text 'Goal' 610, which is a text input 10 or more times within 5 minutes in the chat room, as a scene change text. The display device 300 may apply a hyperlink to the text 'Goal' 610 input in a predetermined round (e.g., the first round) among a plurality of text inputs 'Goal'. When the user clicks on the hyperlink (e.g., inputting a scene change request), the display device 300 may obtain a playback time of the 'goal' scene corresponding to the 'goal' chatting input time to output the same in the scene change to the display 340.

Figure 7:
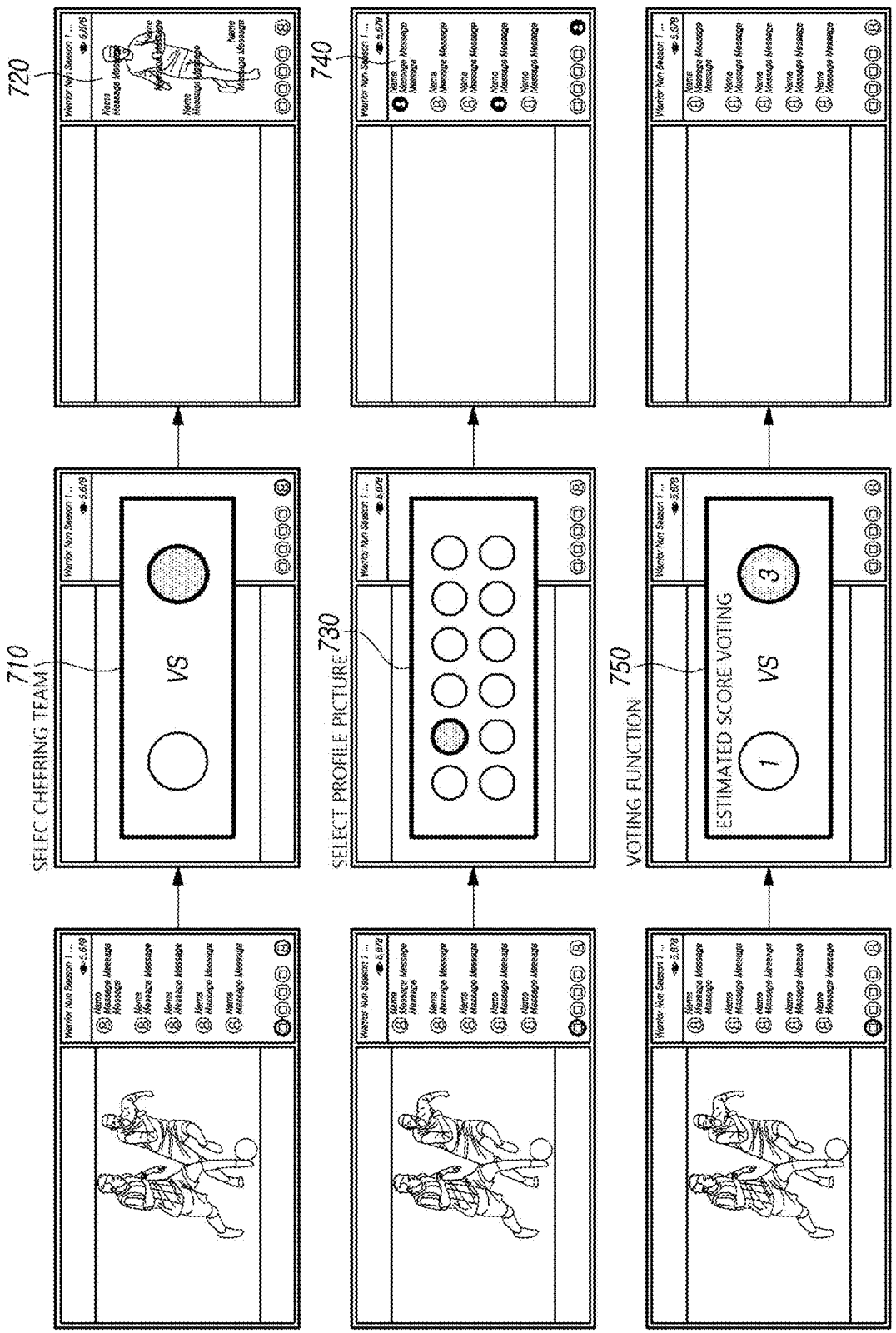
FIG. 7 is a diagram illustrating an example of an additional user interface corresponding to a sports mode, according to various embodiments.

FIG. 7 is a diagram illustrating an example of an additional user interface corresponding to a sports mode according to various embodiments.

Referring to FIG. 7, the display device 300 may provide an emoticon user interface 710 for selecting 'Cheering Team'. When a cheering team is selected based on a user input, the display device 300 may apply and output a background of the chat room in a design style (e.g., color, font, character, etc. representative of the cheering team) representing the selected cheering team (720).

In the illustrated example, the display device 300 may provide a 'profile' setting emoticon user interface 730. When the user selects the 'profile' setting emoticon, the display device 300 may display at least one player and a team character of the sports team corresponding to the real-time viewing video, as a profile emoticon. When a specific profile emoticon is selected based on the user input, the display device 300 may set and output the user's profile emoticon with the selected emoticon (740).

In the illustrated example, the display device 300 may provide a 'voting function' emoticon user interface 750. When a voting function is selected based on a user input, the display device 300 may display a result of the voting in various ways (e.g., in statistical graphics, etc.) and share social activities with chat room participants (not shown).

Figure 8:
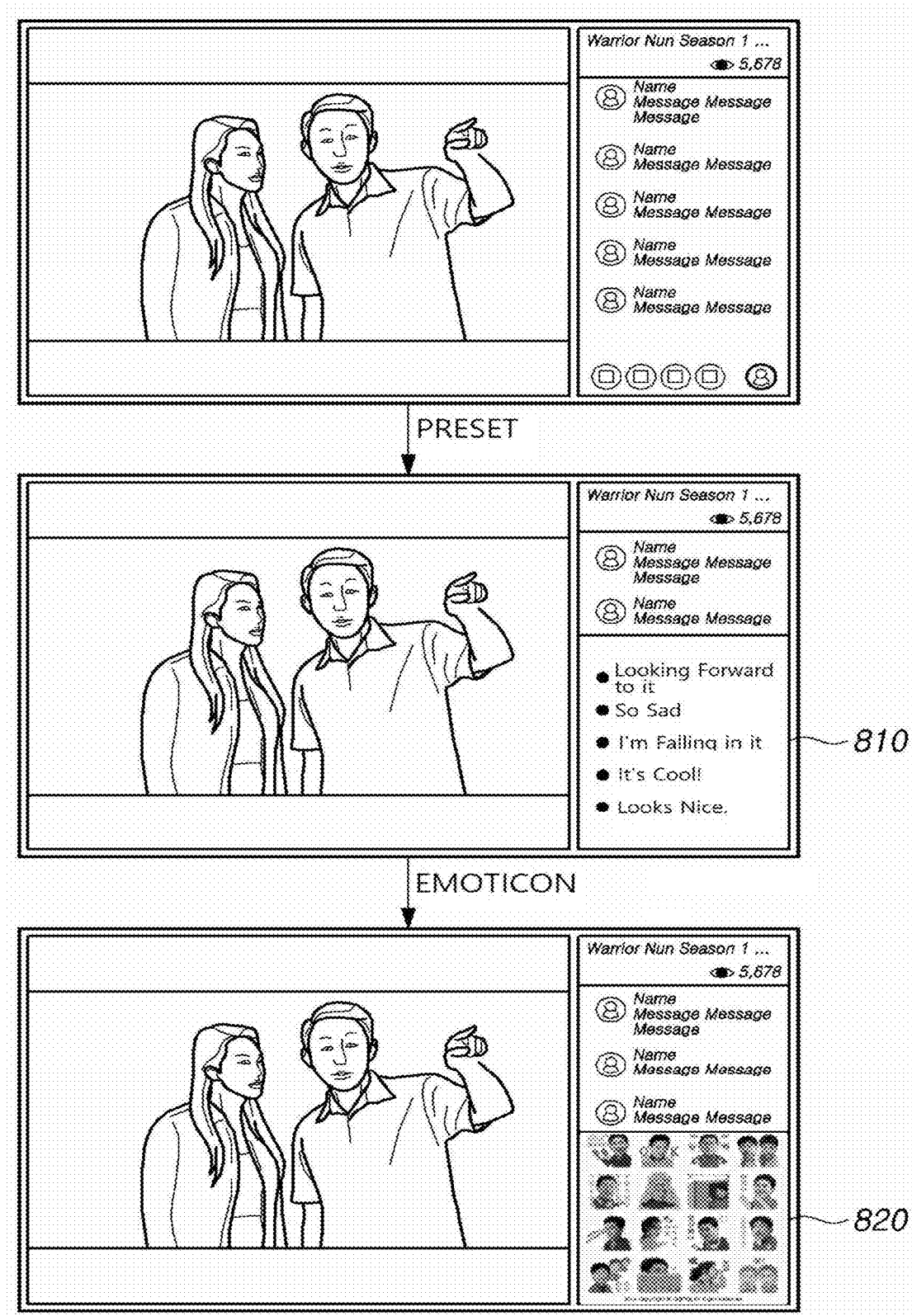
FIG. 8 is a diagram illustrating an example of a user interface including a preset phrase or emoticon corresponding to an appreciation mode, according to various embodiments.

FIG. 8 is a diagram illustrating an example of a user interface including a preset phrase or emoticon corresponding to an appreciation mode according to various embodiments.

Referring to FIG. 8, when the chat mode determined based on the real-time viewing video information is an appreciation mode, the display device 300 may output a user interface including a preset phrase 810 or an emoticon 820 based on a user input, to the display 340. Referring to FIG. 8, when the user clicks a preset request emoticon under the chat room, the display device 300 may receive the preset phrase 810 corresponding to the appreciation mode from a server device providing a chat service and output the same to the display 340. Further, when the user clicks an emoticon for emoticon request under the chat room, the display device 300 may receive a predetermined emoticon 820 from the server device based on at least one of the cast information of the real-time viewing video information and the appreciation mode and output the same to the display 340.

Figure 9:
FIG. 9 is a diagram illustrating an example of a user interface for providing information in response to a chatting word and an information request input in an appreciation mode, according to various embodiments.

FIG. 9 is a diagram illustrating an example of a user interface for providing information in response to a chatting word and an information request input in an appreciation mode, according to various embodiments.

Referring to FIG. 9, the display device 300 may obtain at least one chatting word and a predetermined information request input based on a user input. The user input may include a voice signal or a text received from a mobile electronic device or a remote control. The predetermined information request input may include a predetermined call symbol such as, e.g., '#', '?', etc. Referring to the illustrated example, when the user inputs a text 'story line' and a predetermined information request input in the chat room, the display device 300 may receive story line information 910 up to now from a predetermined server device and display the same to the display 340. When the user inputs the text 'story line' and a predetermined information request input in the chat room, the display device 300 may analyze at least one of the real-time viewing video, the real-time viewing video information, and the chatting history of the chat room to obtain the story line information 910 up to now, and output the same to the display 910. Referring to the illustrated example, when the user inputs 'cast' and a predetermined information request input in the chat room, the display device 300 may receive at least one cast member information 920 corresponding to the real-time viewing video from a predetermined server device and output the same to the display 340. When the user inputs a text 'cast' and a predetermined information request input in the chat room, the display device 300 may analyze at least one of the real-time viewing video, the real-time viewing video information, and the chatting history of the chat room to obtain at least one cast member information 920 and output the same to the display 340.

Figure 10:
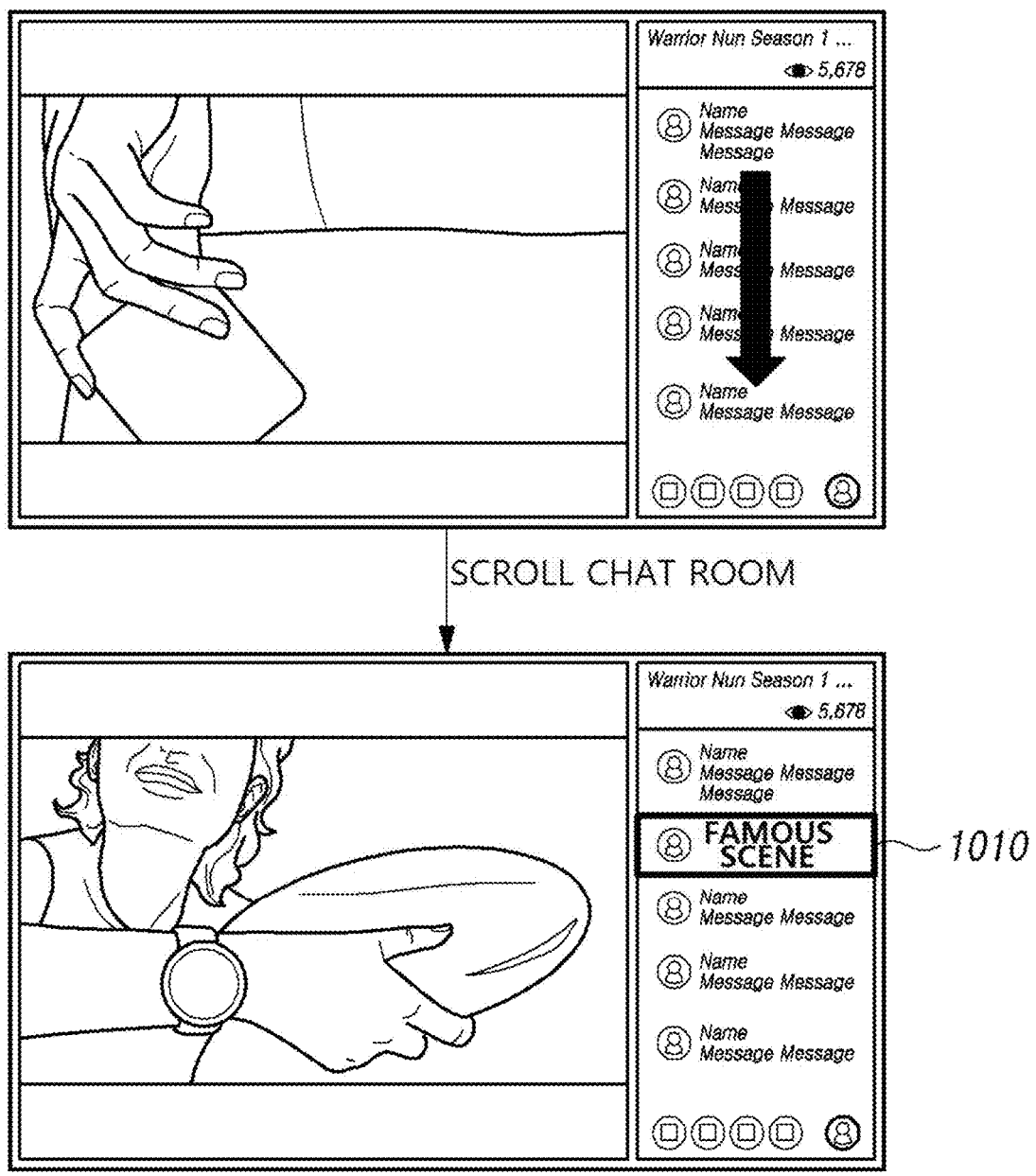
FIG. 10 is a diagram illustrating an example of a screen for inputting a scene change request for a scene change text and moving to a corresponding scene to output the screen in an appreciation mode, according to various embodiments.

FIG. 10 is a diagram illustrating an example screen for inputting a scene change request input for a scene change text and moving to a corresponding scene to output the screen, in an appreciation mode according to various embodiments.

Referring to FIG. 10, the display device 300 may obtain a scene change text in the chat room based on a predetermined criterion. In relation to the predetermined criterion, the display device 300 may obtain the text input more than a predetermined number of times within a predetermined time in the chat room, as scene change text, or store at least one scene change text that may be related to a main scene in each chat mode, in the memory 320 in advance, and obtain a text input to the chat room among the at least one scene change text, as a scene change text. In the illustrated example, the display device 300 may obtain a text 'famous scene' 1010, which is one of the at least one scene change text stored in the memory 310, as a scene change text in the chat room, in response to the appreciation mode. The display device 300 may apply a hyperlink to the input text 'famous scene' 1010. When the user clicks on the hyperlink (e.g., inputting a scene change request), the display device 300 may obtain a scene playback time corresponding to the 'famous scene' to output the changed scene to the display 340. The display device 300 may receive and obtain the scene playback time corresponding to the 'famous scene' from a video providing server, or may analyze and obtain at least one of the real-time viewing video, the real-time viewing video information, and the chatting history of the chat room.

Figure 11:
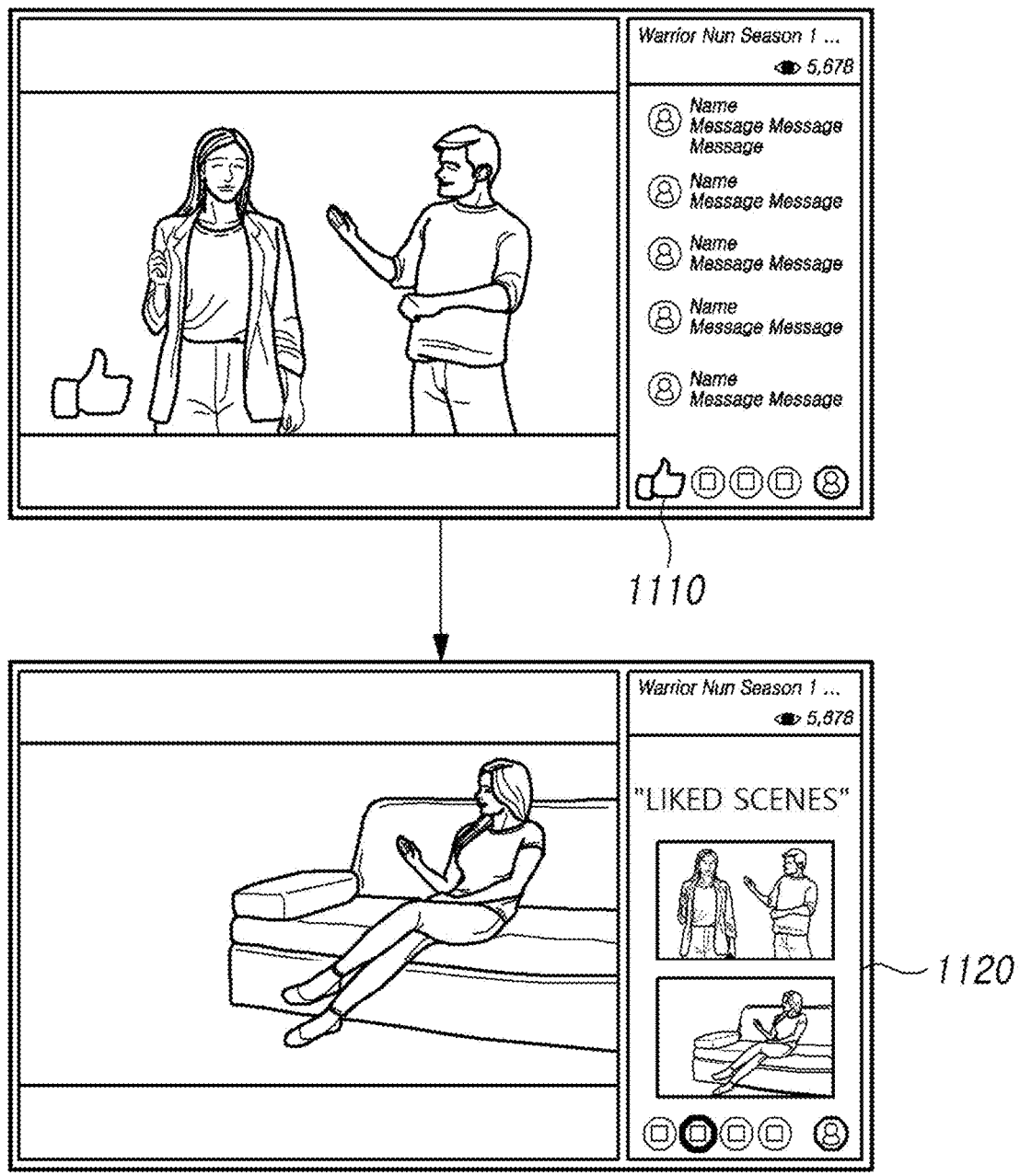
FIG. 11 is a diagram illustrating an example of a user interface providing a 'Like' tagging function and so on in an appreciation mode, according to various embodiments.

FIG. 11 is a diagram illustrating an example of a user interface providing a 'Like' tagging function, etc. in an appreciation mode according to various embodiments.

Referring to FIG. 11, the display device 300 may provide a 'Like' tagging user interface 1110 while playing a real-time viewing video. The display device 300 may tag a specific scene as 'Like' based on a user input. When the user selects and inputs a 'Like list' query emoticon, the display device 300 may display the scenes to which chat room participants tagged 'Like' (1120), and when the user selects a specific scene, it may output a changed scene to the corresponding scene.

Figure 12:
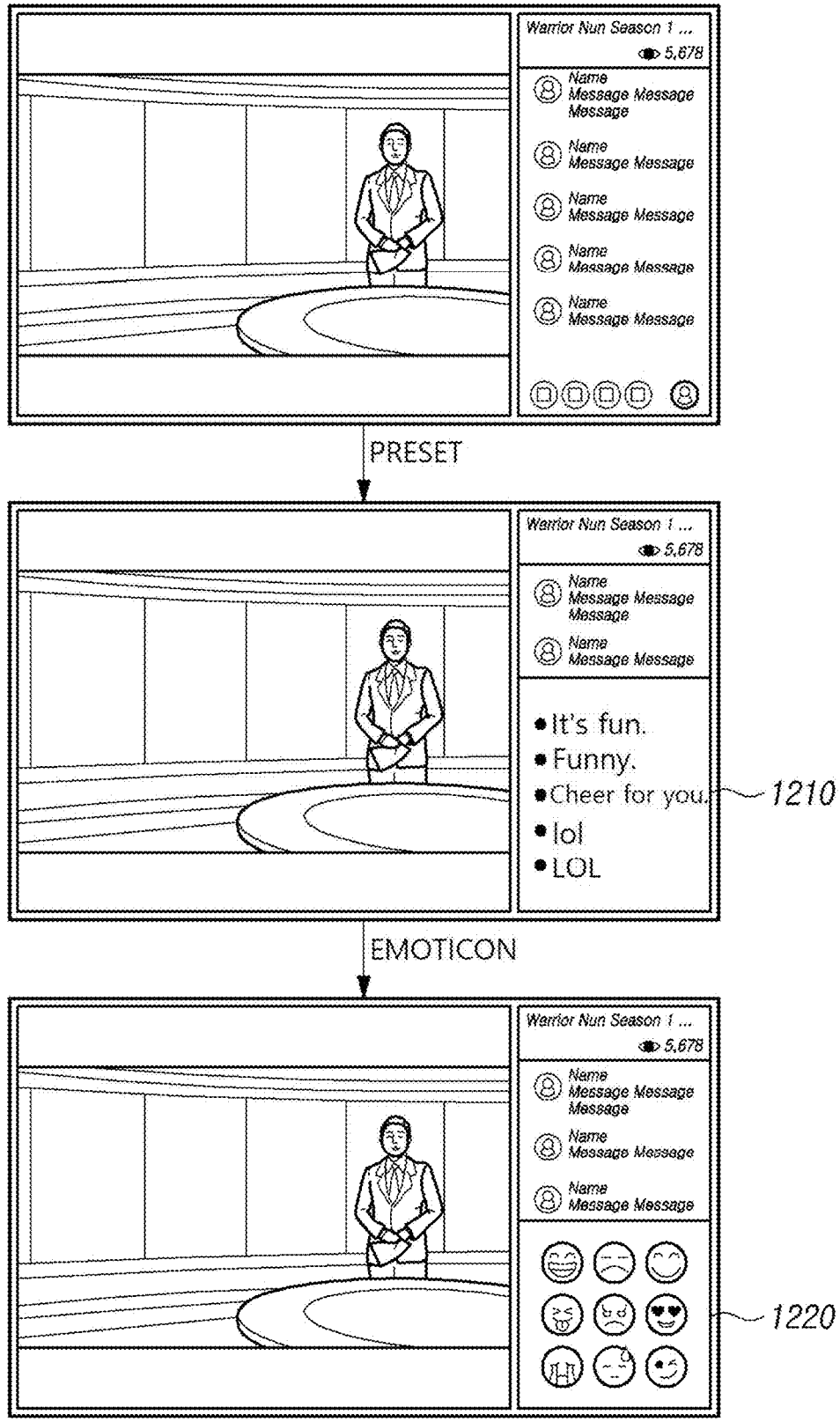
FIG. 12 is a diagram illustrating an example of a user interface including a preset phrase or emoticon corresponding to an entertainment mode, according to various embodiments.

FIG. 12 is a diagram illustrating an example of a user interface including preset phrases or emoticons corresponding to an entertainment mode according to various embodiments.

Referring to FIG. 12, when the chat mode determined based on the real-time viewing video information is an entertainment mode, the display device 300 may output, to the display 340, a user interface including a predetermined preset phrase 1210 or an emoticon 1220 based on a user input. Referring to FIG. 12, when a user clicks a preset request emoticon under the chat room, the display device 300 may receive a preset phrase 1210 corresponding to the entertainment mode from a server device providing a chat service and output the same to the display 340. Further, when the user clicks an emoticon for emoticon request under the chat room, the user may receive a predetermined emoticon 1220 from the server device based on at least one of the entertainment mode, the cast information and the character information of the real-time viewing video information, and display the same to the display 340.

Figure 13:
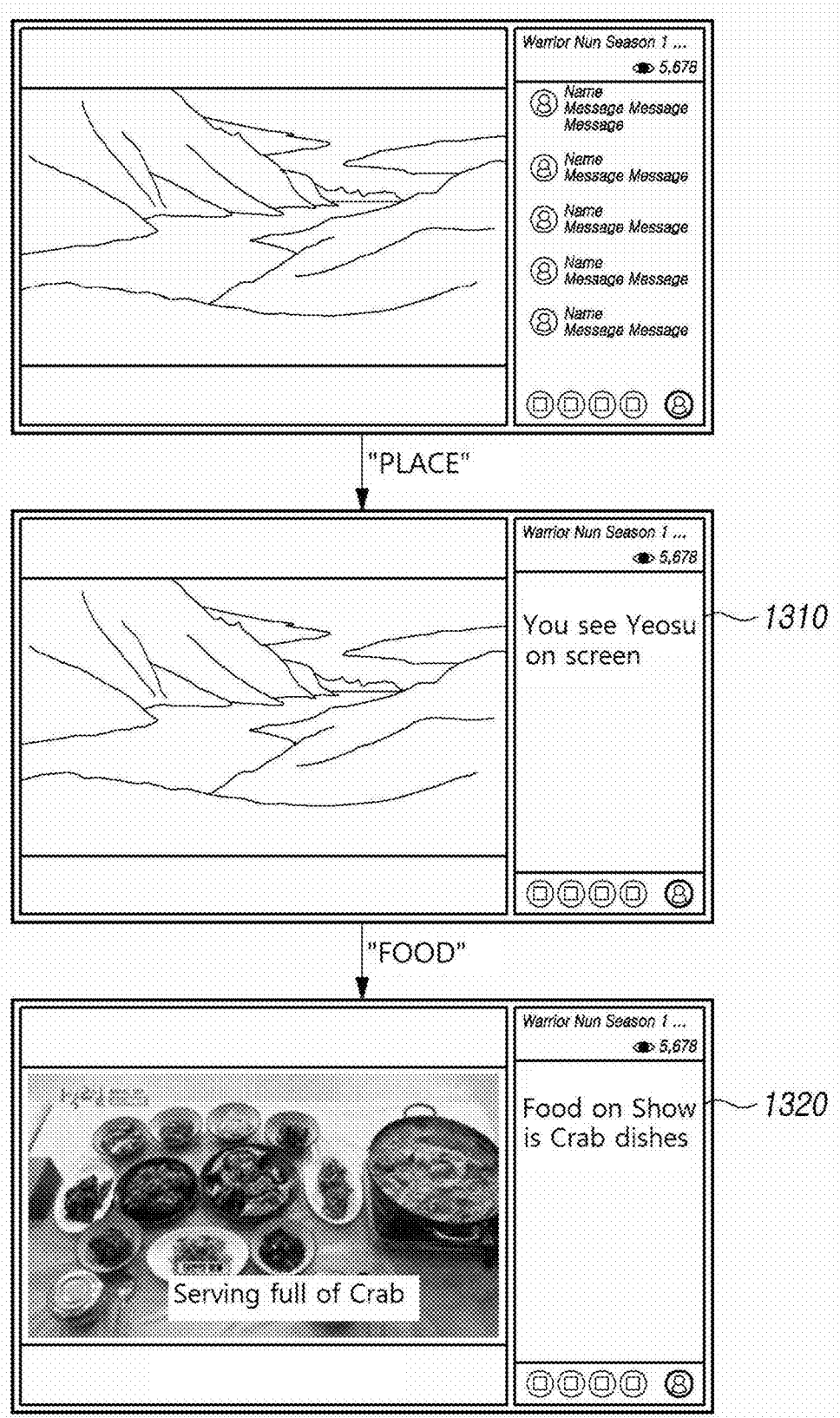
FIG. 13 is a diagram illustrating an example of a user interface providing information in response to a chatting word and an information request input in an entertainment mode, according to various embodiments.

FIG. 13 is a diagram illustrating an example of a user interface for providing information in response to a chatting word and an information request input in an entertainment mode according to various embodiments.

Referring to FIG. 13, the display device 300 may obtain at least one chatting word and a predetermined information request input, based on a user input. The user input may include a voice signal or a text received from a mobile electronic device or a remote control. The predetermined information request input may include predetermined call symbols such as, e.g., '#', '?', etc. Referring to the illustrated example, when the user inputs a text 'place' and a predetermined information request input in the chat room, the display device 300 may receive place information 1310 corresponding to the currently played scene from a predetermined server device, and may output the same to the display 340. When the user inputs the 'place' and a predetermined information request input in the chat room, the display device 300 may analyze at least one of the real-time viewing video, the real-time viewing video information, and the chatting history of the chat room to obtain place information 1310 corresponding to the currently played scene and output the same to the display 340. Referring to the illustrated example, when the user inputs a text 'food' and a predetermined information request input in the chat room, the display device 300 may receive food information 1320 corresponding to the currently played scene from a predetermined server device and output the same to the display 340. When the user inputs the 'food' and a predetermined information request input in the chat room, the display device 300 may analyze at least one of the real-time viewing video, the real-time viewing video information, and the chatting history of the chat room to obtain the food information 1320 corresponding to the currently played scene and output the same to the display 340.

Figure 14:
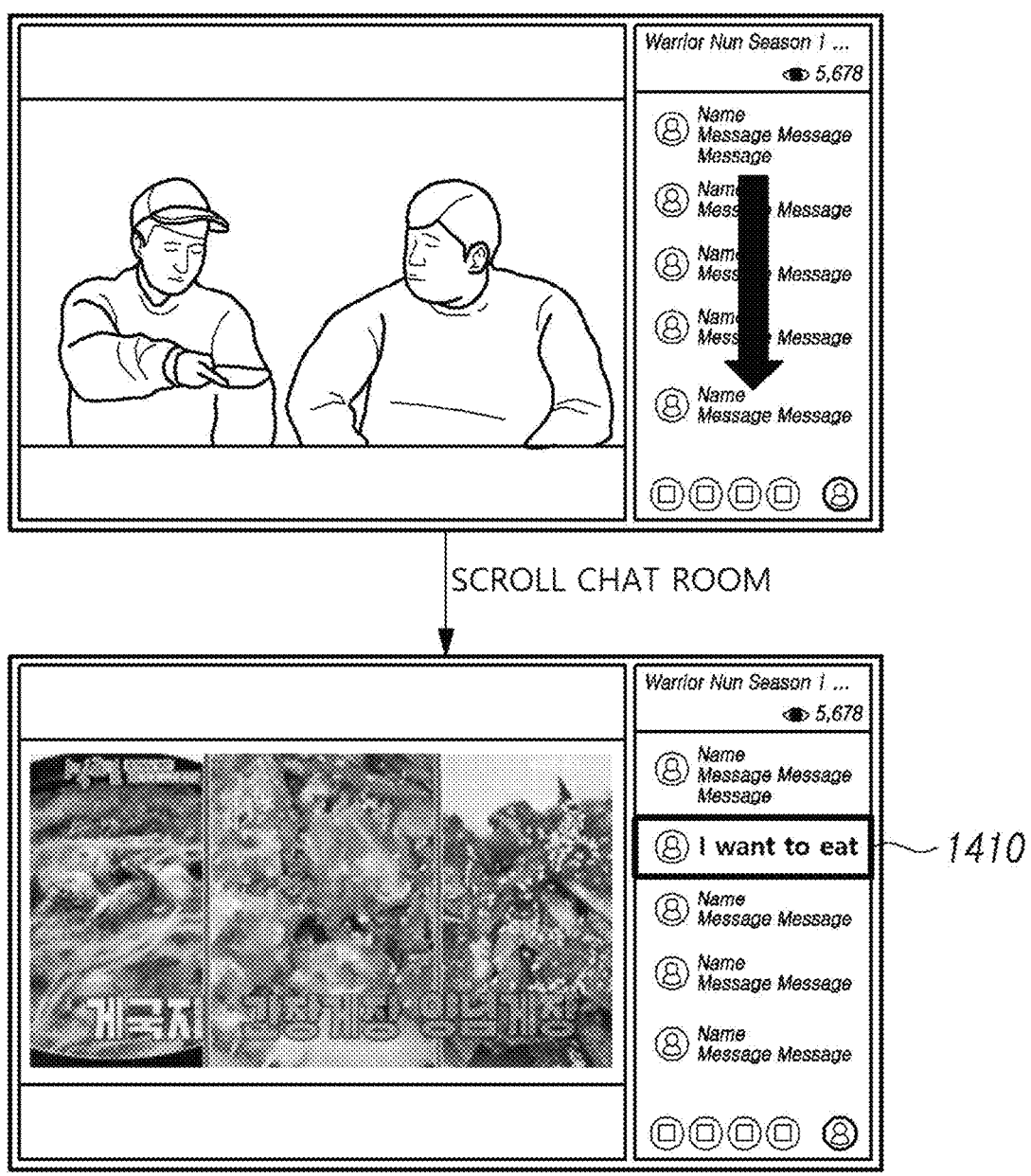
FIG. 14 is a diagram illustrating an example of a screen for inputting a scene change request for a scene change text and moving to a corresponding scene to output the screen in an entertainment mode, according to various embodiments.

FIG. 14 is a diagram illustrating an example screen for outputting a scene change request input for a scene change text and moving to a corresponding scene in an entertainment mode according to various embodiments.

Referring to FIG. 14, the display device 300 may obtain a scene change text in the chat room based on a predetermined criterion. In relation to the predetermined criterion, the display device 300 may obtain the text input more than a predetermined number of times within a predetermined time in the chat room, as a scene change text, or store at least one scene change text that may be related to a main scene in each chat mode, in the memory 320 in advance, and obtain the text input to the chat room among the at least one scene change text, as a scene change text. In the illustrated example, the display device 300 may obtain, as a scene change text, a text 'I want to eat' 1410, which is a text that has been input, either identically or similarly, 10 times or more within 5 minutes in the chat room. The display device 300 may apply a hyperlink to the text 'I want to eat' 1410 input in a predetermined round (e.g., the first round) among the texts input identically or similarly as the text 'I want to eat'. When the user clicks the hyperlink (that is, inputting a scene change request), the display device 300 may obtain a scene playback time corresponding to a chatting input time of the text 'I want to eat' to output the changed scene to the display 340.

Figure 15:
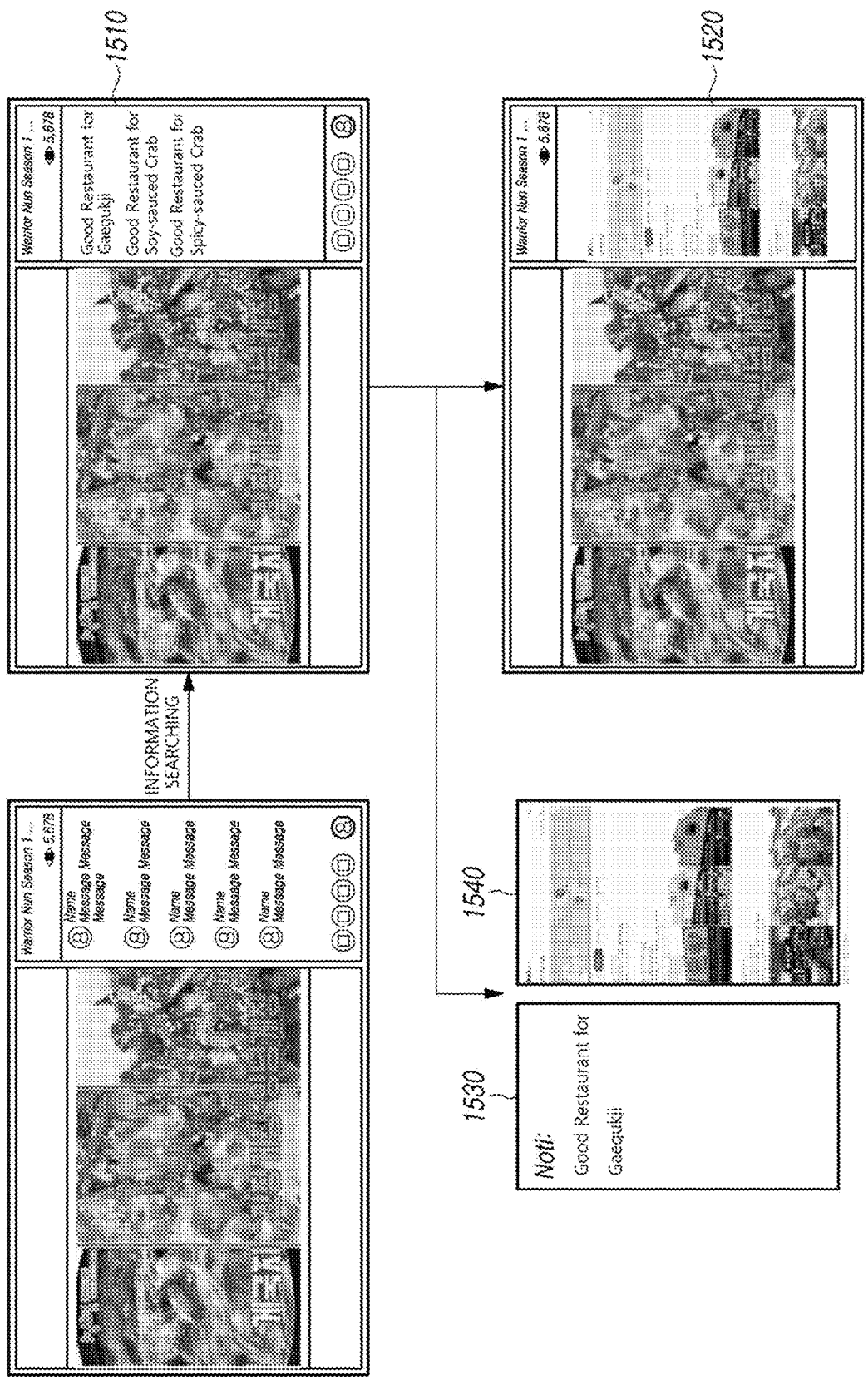
FIG. 15 is a diagram illustrating an example of a user interface providing an information search function in an entertainment mode, according to various embodiments.

FIG. 15 is a diagram illustrating an example of a user interface providing an information search function in an entertainment mode according to various embodiments.

Referring to FIG. 15, the display device 300 may provide a user interface for an 'information search' request, while playing a real-time viewing video. The display device 300 may display information on a real-time viewing video part corresponding to the timing of the 'information search' request (1510). The display device 300 may obtain the information on the real-time viewing video part from the real-time viewing video information or obtain the same by receiving it from a predetermined server device. The predetermined server device may include a predetermined server providing information such as e.g., a chat server and a portal server. The display device 300 may provide user feedback on the provided information to the predetermined server device, based on a user input, and the predetermined server device may learn the user feedback to provide information preferred by users later to the display device 300.

In the illustrated example, the display device 300 may display the real-time viewing video part with a hyperlink applied thereto and display more detailed information when the user clicks (1520). Further, the display device 300 may control the communication module 350 based on a user input to provide more detailed information to a mobile electronic device (1530 and 1540).

Figure 16:
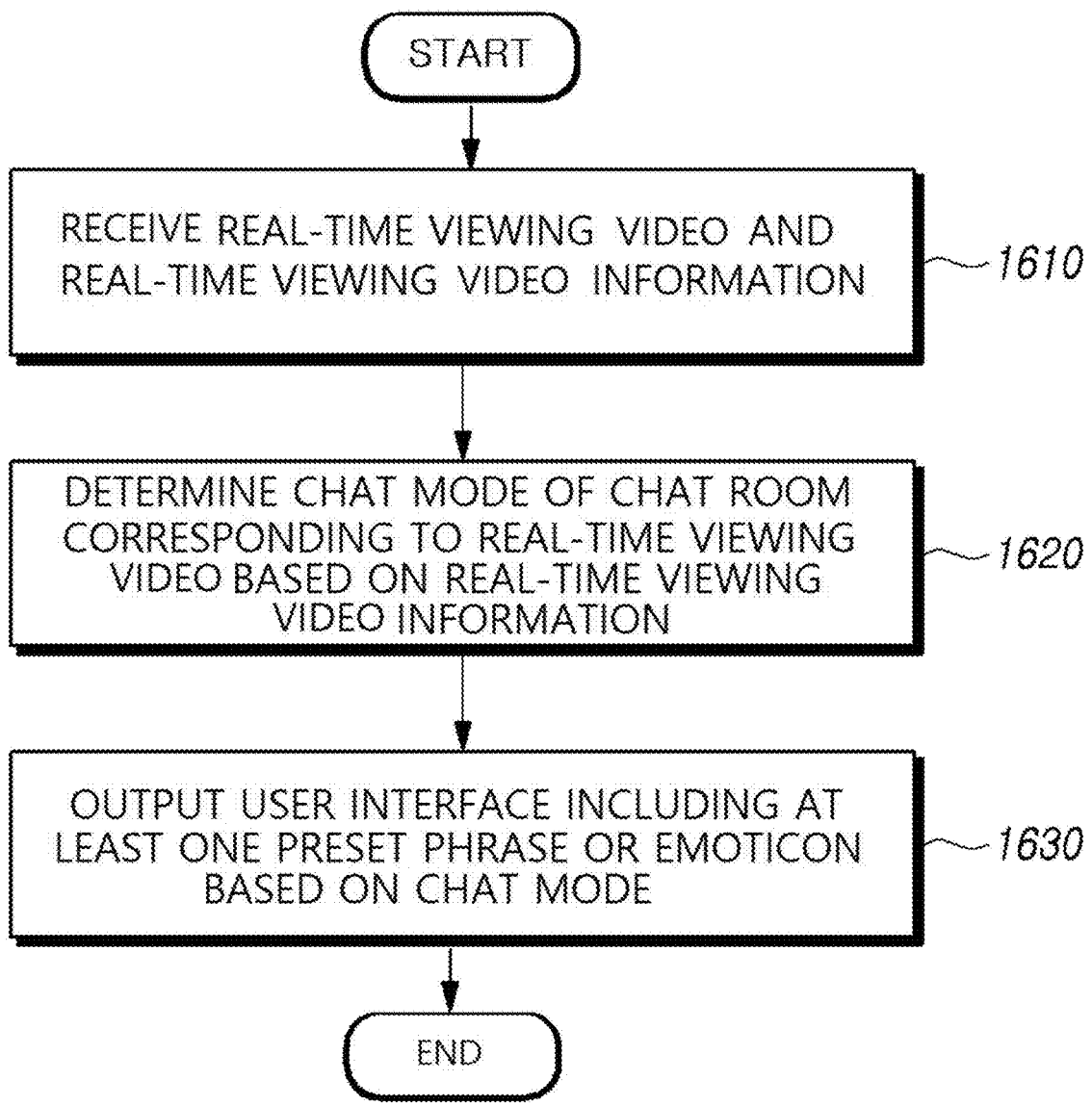
FIG. 16 is a flowchart illustrating an example method for providing a user interface including a preset phrase or emoticon based on a chat mode, according to various embodiments.

FIG. 16 is a flowchart illustrating an example method of providing a user interface including a preset phrase or emoticon based on a chat mode, according to various embodiments.

Referring to FIG. 16, in operation 1610 according to an embodiment, the display device 300 may receive a real-time viewing video and real-time viewing video information.

In operation 1620, the display device 300 may determine a chat mode of a chat room corresponding to the real-time viewing video, based on the real-time viewing video information. The real-time viewing video information may include video metadata including identification information, genre information, cast information, character information of a real-time viewing video, and the like. The chat mode may include at least one of e.g., a sports mode, an information mode, an entertainment mode, an appreciation mode, a kids mode, a cast mode, and a character mode. The display device 300 may automatically determine a chat mode based on the real-time viewing video information, or output the chat mode to the display 340 and then determine it by receiving a selected input from the user.

In operation 1630, the display device 300 may output a user interface including at least one preset phrase or at least one emoticon based on the chat mode. The display device 300 may store the at least one preset phrase or the at least one emoticon corresponding to the chat mode, in the memory 320 in advance based on a user input, or after receiving the real-time viewing video, control the communication module 350 at a predetermined timing point to receive the same from a server device providing a chat service and store it in the memory 320. Further, according to an embodiment, the display device 300 may further consider the chat mode as well as the real-time viewing video information, and receive the at least one preset phrase the at least one emoticon corresponding to the chat mode and the real-time viewing video information from the server device to store the same in the memory 320.

Figure 17:
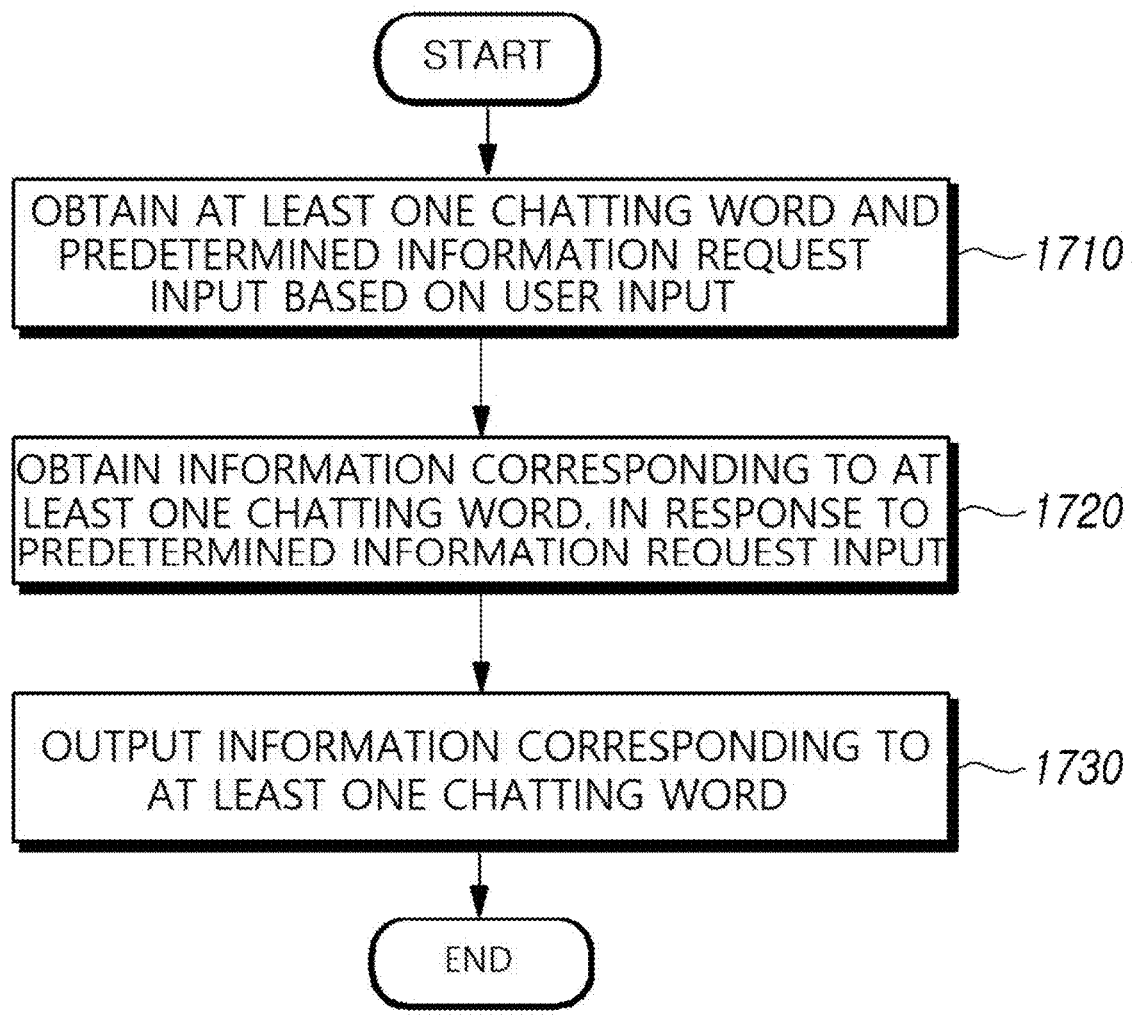
FIG. 17 is a flowchart illustrating an example method for providing a user interface outputting information in response to a chatting word and a predetermined information request input, according to various embodiments.

FIG. 17 is a flowchart illustrating an example method of providing a user interface for outputting information in response to a chatting word and a predetermined information request input, according to various embodiments.

Referring to FIG. 17, in operation 1710 according to an embodiment, the display device 300 may obtain at least one chatting word and a predetermined information request input based on a user input. The user input may include a voice signal or a text received from a mobile electronic device or a remote control. The predetermined information request input may include a predetermined call symbol such as e.g., '#', '?', etc.

In operation 1720, the display device 300 may obtain information corresponding to the at least one chatting word, in response to the predetermined information request input. For example, the display device 300 may receive the information corresponding to the at least one chatting word from a predetermined server device, in response to the predetermined information request input. The predetermined server device may include a predetermined server device providing information such as a chat server and a portal server. For another example, in response to the predetermined information request input, the display device 300 may analyze at least one of the real-time viewing video, the real-time viewing video information, and the chatting history of the chat room to obtain the information corresponding to the at least one chatting word. It would be apparent to those skilled in the art that there may be various methods for the display device 300 to request and receive the information corresponding to the at least one chatting word from the predetermined server device.

In operation 1730, the display device 300 may output the information corresponding to the at least one chatting word.

Figure 18:
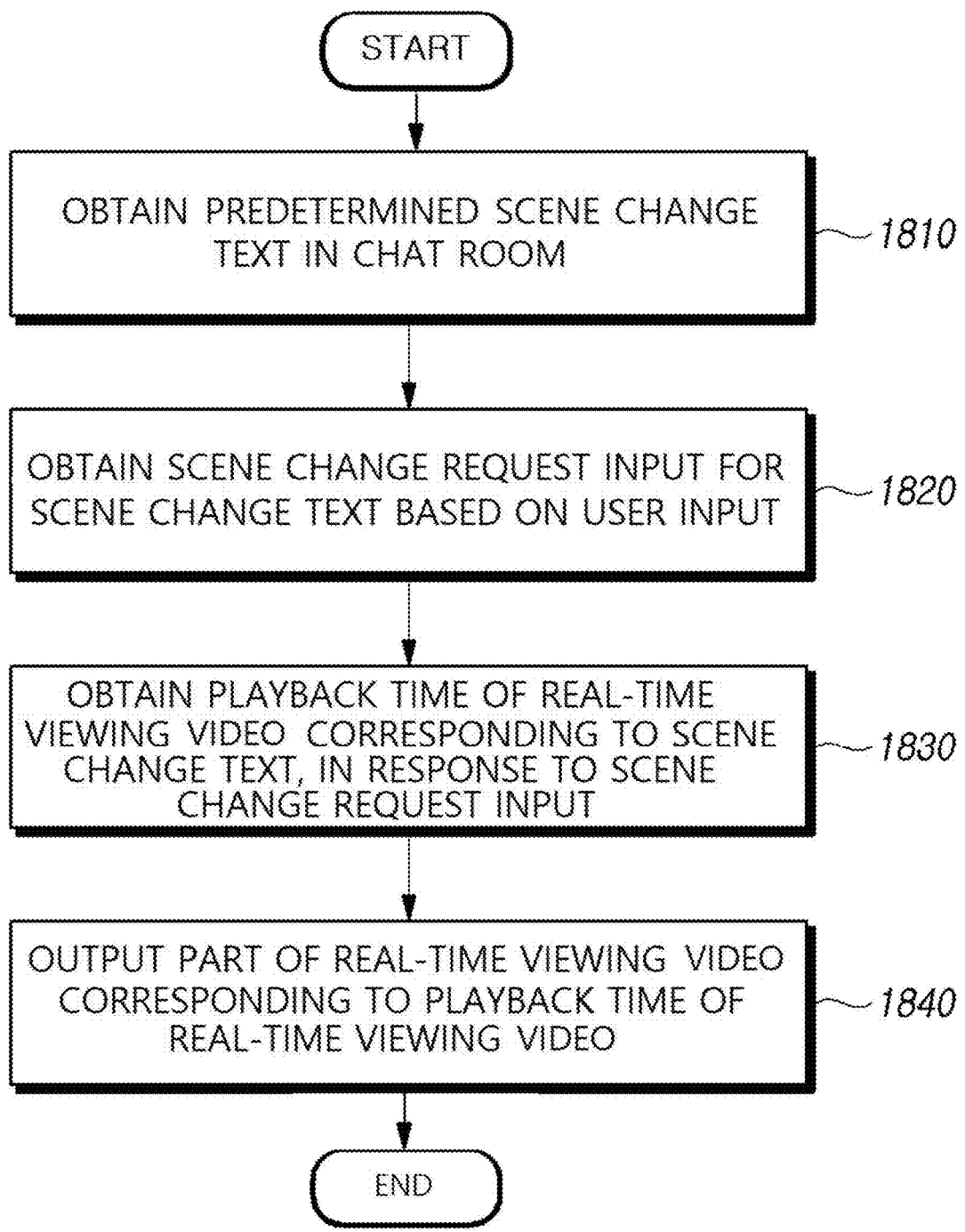
FIG. 18 is a flowchart illustrating an example method for providing a user interface for changing a scene to output the scene in response to obtaining a scene change text and inputting a scene change request, according to various embodiments.

FIG. 18 is a flowchart illustrating an example method of providing a user interface for changing and outputting a scene, in response to obtaining a scene change text and inputting a scene change request, according to various embodiments.

Referring to FIG. 18, in operation 1810 according to an embodiment, the display device 300 may obtain a scene change text in a chat room based on a predetermined criterion. In relation to the predetermined criterion, the display device 300 may acquire the text input more than a predetermined number of times within a predetermined time in the chat room, as a scene change text, or store at least one scene change text that may be related to a main scene in each chat mode, in the memory 320 in advance, and obtain a text input to the chat room among the at least one scene change text, as a scene change text. In addition, it would be apparent to those skilled in the art that the predetermined criteria for obtaining the scene change text may vary.

In operation 1820, the display device 300 may obtain a scene change request input for the scene change text based on the user input. For example, the scene change request input may include an input by which the user clicks the scene change text with a hyperlink applied thereto.

In operation 1830, in response to the scene change request input, the display device 300 may obtain a playback time of the real-time viewing video corresponding to the scene change text. The display device 300 may receive and obtain the playback time of the real-time viewing video corresponding to the scene change text from a video server, or analyze at least one of the real-time viewing video, the real-time viewing video information, and the chatting history of the chat room. It would be apparent to those skilled in the art that the display device 300 may obtain the playback time of the real-time viewing video corresponding to the scene change text in various ways.

In operation 1840, the display device 300 may output the real-time viewing video part corresponding to the playback time of the real-time viewing video.

The electronic device according to various embodiments disclosed herein may be one of various types of electronic devices. The electronic devices may include, for example, a display device, a portable communication device (e.g., a smartphone), a computer device, a portable multimedia device, a portable medical device, a camera, a wearable device, a home appliance, or the like. The electronic devices according to an embodiment of the present disclosure are not limited to those described above.

The various embodiments and terms used herein are not intended to limit the technical features described herein to specific embodiments and should be understood to include various modifications, equivalents, or substitutes of the embodiment. For example, an element expressed in a singular should be understood as a concept including a plurality of elements unless the context clearly refers only the singular. It should be understood that the term 'and/or' as used herein is intended to encompass any and all possible combinations of one or more of the enumerated items. As used in the present disclosure, the terms such as 'comprise(s)', 'include(s)' 'have/has', 'configured of', etc. are only intended to designate that the features, components, parts, or combinations thereof described in the present disclosure exist, and the use of these terms is not intended to exclude the possibility of the presence or addition of one or more other features, components, parts, or combinations thereof. In this disclosure, each of the phrases such as "A or B", "at least one of A and B", "at least one of A or B", "A, B or C", "at least one of A, B and C", and "at least one of A, B, or C" may include any one of the items enumerated together in a corresponding one of the phrases, or all possible combinations thereof. Terms such as "the first", "the second", or "first", or "second" may be used simply to distinguish a corresponding component from another corresponding component, and do not limit the corresponding components in view of other aspect (e.g., importance or order).

The term "module" or "unit" used in various embodiments of the present disclosure may include a unit implemented in hardware, software, or firmware, or any combination thereof, and be used interchangeably with terms such as e.g., logic, logic block, part, component, or circuitry, for example. The module or unit may be a minimum unit or a part of the integrally configured component or the component that performs one or more functions. For example, according to an embodiment, the module or unit may be implemented in the form of an application-specific integrated circuit (ASIC).

The term "in case~" used in various embodiments of the present disclosure, may be construed to refer, for example, to "when~" or "when~", or "in response to determining~" or "in response to detecting~", depending on the context. Similarly, the term "when it is determined that~" or "when it is detected that~" may be interpreted to refer, for example, to "upon determining~" or "in response to determining~", or "upon detecting~" or "in response to detecting~", depending on the context.

The program executed by the display device 300 described herein may be implemented as a hardware component, a software component, and/or a combination of the hardware component and the software component. The program may be executed by any system capable of executing computer readable instructions.

Software may include a computer program, codes, instructions, or a combination of one or more of these, and may configure a processing unit to perform operations as desired or command the processing unit independently or in combination (collectively). The software may be implemented as a computer program including instructions stored in a computer-readable storage medium. The computer-readable storage medium may include, for example, a magnetic storage medium (e.g., read-only memory (ROM), random-access memory (RAM), floppy disk, hard disk, and so on), an optically readable medium (e.g., CD-ROM, digital versatile disc (DVD), or the like) and so on. The computer-readable storage medium may be distributed among network-connected computer systems, so that the computer-readable code may be stored and executed in a distributed manner. The computer program may be distributed (e.g., downloaded or uploaded) by online, either via an application store (e.g. Play Store™) or directly between two user devices (e.g., smartphones). In the case of online distribution, at least a part of the computer program product may be temporarily stored or temporarily generated in a machine-readable storage medium such as a memory of a server of a manufacturer, a server of an application store, or a relay server.

According to various embodiments, each component (e.g., module or program) of the above-described components may include a singular or a plurality of entities, and some of the plurality of entities may be separated and placed into other components. According to various embodiments, one or more components or operations among the above-described corresponding components may be omitted, or one or more other components or operations may be added thereto. Alternatively or additionally, a plurality of components (e.g., a module or a program) may be integrated into one component. In this case, the integrated component may perform one or more functions of each component of the plurality of components identically or similarly to those performed by the corresponding component among the plurality of components prior to the integration. According to various embodiments, operations performed by a module, program, or other component may be executed sequentially, in parallel, repeatedly or heuristically, or one or more of the operations may be executed in a different order or omitted, or one or more other operations may be added thereto.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A display device comprising:
    a communication module comprising communication circuitry; and
    a non-transitory memory storing at least one instruction;
    one or more processors electrically connected to the display, the communication module, and the memory and configured to execute the at least one instruction; and
    a video input module comprising circuitry and configured to receive a real-time viewing video and real-time viewing video information;
    wherein the one or more processors are configured to:
    determine, among a plurality of predetermined chat modes, a chat mode of a chat room corresponding to the real-time viewing video based on the real-time viewing video information, and
    output, to the display, a user interface including a plurality of specified phrases or a plurality of emoticons based on the determined chat mode.

2. The display device of claim 1,
    wherein the one or more processors are configured to store the plurality of specified phrases or the plurality of emoticons corresponding to the chat mode in the memory, and
    wherein the chat mode includes at least one of a sports mode, an information mode, an entertainment mode, an appreciation mode, a kids' mode, a cast mode, and a character mode.

3. The display device of claim 1, wherein the one or more processors are configured to control the communication module to receive, from a server device, the plurality of specified phrases or the plurality of emoticons corresponding to the chat mode.

4. The display device of claim 1, wherein the one or more processors are configured to control the communication module to receive, from a server device, the plurality of specified phrases or the plurality of emoticons corresponding to the chat mode and the real-time viewing video information.

5. The display device of claim 1, wherein the one or more processors are configured to:
    obtain at least one chatting word and a specified information request input;
    in response to the specified information request input, obtain information corresponding to the at least one chatting word; and
    output the information corresponding to the at least one chatting word to the display;
    wherein the input includes a voice signal or a text received from a mobile electronic device or a remote control.

6. The display device of claim 5, wherein the one or more processors are configured to:
    in response to the specified information request input, control the communication module to receive the information corresponding to the at least one chatting word from a server device.

7. The display device of claim 5, wherein the one or more processors are configured to:
    in response to the specified information request input, analyze at least one of the real-time viewing video, the real-time viewing video information, and a chatting history of the chat room to obtain the information corresponding to the at least one chatting word.

8. The display device of claim 1, wherein the one or more processors are configured to obtain a text input more than a specified number of times within a specified time in the chat room, as a scene change text.

9. The display device of claim 8, wherein the one or more processors are configured to:
    obtain a scene change request input for the scene change text;
    in response to the scene change request input, obtain a playback time of the real-time viewing video corresponding to the scene change text; and
    output, to the display, a portion of the real-time viewing video corresponding to the playback time of the real-time viewing video.

10. The display device of claim 1,
    wherein the video input module comprises at least one of a tuner and an input/output module comprising input/output circuitry, and is configured to receive the real-time viewing video and the real-time viewing video information through at least one of the tuner, the input/output module, and the communication module; and
    wherein the input/output module comprises at least one of a high-definition multimedia interface (HDMI) input port, a component input jack, a personal computer (PC) input port, and a universal serial bus (USB) input jack.

11. A method for providing a chat room user interface, comprising:
    receiving a real-time viewing video and real-time viewing video information;
    determining, among a plurality of predetermined chat modes, a chat mode of a chat room corresponding to the real-time viewing video based on the real-time viewing video information; and
    outputting a user interface including a plurality of specified phrases or a plurality of emoticons based on the determined chat mode.

12. The method of claim 11, further comprising:
storing the plurality of specified phrases or the plurality of emoticons corresponding to the chat mode;
wherein the chat mode comprises at least one of a sports mode, an information mode, an entertainment mode, an appreciation mode, a kids' mode, a cast mode, and a character mode.

13. The method of claim 11, further comprising:
receiving, from a server device, the plurality of specified phrases or the plurality of emoticons.

14. The method of claim 11, further comprising:
receiving, from a server device, the plurality of specified phrases or the plurality of emoticons corresponding to the chat mode and the real-time viewing video information.

15. The method of claim 11, further comprising:
obtaining at least one chatting word and a specified information request input;
obtaining information corresponding to the at least one chatting word in response to the specified information request input; and
outputting the information corresponding to the at least one chatting word;
wherein the input comprises a voice signal or a text received from a mobile electronic device or a remote control.

16. The method of claim 15, further comprising:
in response to the specified information request input, receiving the information corresponding to the at least one chatting word from a server device.

17. The method of claim 15, further comprising:
in response to the specified information request input, analyzing at least one of the real-time viewing video, the real-time viewing video information, and a chatting history of the chat room to obtain the information corresponding to the at least one chatting word.

18. The method of claim 11, further comprising:
obtaining a text input more than a specified number of times within a specified time in the chat room, as a scene change text.

19. The method of claim 18, further comprising:
obtaining a scene change request input for the scene change text;
in response to the scene change request input, obtaining a playback time of the real-time viewing video corresponding to the scene change text; and
outputting a portion of the real-time viewing video corresponding to the playback time of the real-time viewing video.

* * * * *